(12) United States Patent
Ohira et al.

(10) Patent No.: US 8,457,492 B2
(45) Date of Patent: Jun. 4, 2013

(54) OPTICAL ACCESS SYSTEM

(75) Inventors: Masaki Ohira, Yokohama (JP); Tohru Kazawa, Kokubunji (JP); Yusuke Yajima, Fujisawa (JP); Akihiko Tsuchiya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 12/785,693

(22) Filed: May 24, 2010

(65) Prior Publication Data

US 2010/0296811 A1 Nov. 25, 2010

(30) Foreign Application Priority Data

May 25, 2009 (JP) ................... 2009-125270

(51) Int. Cl.
*H04B 10/20* (2006.01)
*H04J 14/00* (2006.01)

(52) U.S. Cl.
USPC .................. 398/58; 398/67; 398/72

(58) Field of Classification Search
USPC .......... 398/27, 33, 58, 66, 67, 69–72
See application file for complete search history.

(56) References Cited

U.S. PATENT DOCUMENTS

| | | | |
|---|---|---|---|
| 8,122,325 B2 * | 2/2012 | Effenberger | 714/775 |
| 2002/0104053 A1 * | 8/2002 | Lei et al. | 714/752 |
| 2008/0145064 A1 | 6/2008 | Ohira et al. | |
| 2008/0163021 A1 | 7/2008 | Ohira et al. | |
| 2009/0044079 A1 * | 2/2009 | de Lind Van Wijngaarden et al. | 714/774 |
| 2010/0215369 A1 * | 8/2010 | Effenberger et al. | 398/67 |

FOREIGN PATENT DOCUMENTS

| | | |
|---|---|---|
| JP | 2006-14228 A | 1/2006 |
| JP | 2007-36712 A | 2/2007 |
| JP | 2008-60820 A | 3/2008 |
| JP | 2008-148245 A | 6/2008 |
| JP | 2008-288973 A | 11/2008 |
| JP | 2008-306434 A | 12/2008 |

\* cited by examiner

*Primary Examiner* — Dalzid Singh
(74) *Attorney, Agent, or Firm* — Mattingly & Malur, PC

(57) ABSTRACT

There are provided multiple candidates for FEC codes selectable for each of the ONTs. An OLT is provided with: means for storing redundancy and a code length of each FEC code in a table; means for selecting an FEC code; means for encoding or decoding data using the selected FEC code; means for calculating a bandwidth in consideration for the FEC redundancy and the code length with reference to the table during band assignment calculation; and means for notifying the destination ONT of the selected FEC code.

11 Claims, 20 Drawing Sheets

| | FEC CODE | CODE FORMAT | MULTIPLEX CORRECTION | CODE LENGTH | INFORMATION LENGTH | REDUNDANCY |
|---|---|---|---|---|---|---|
| | 211 | 212 | 213 | 214 | 215 | 216 |
| | RS-8 (255, 239) | REED-SOLOMON | 8 BYTES | 255 BYTES | 239 BYTES | 16 BYTES |
| | RS-8 (205, 189) | REED-SOLOMON | 8 BYTES | 205 BYTES | 189 BYTES | 16 BYTES |
| | RS-8 (155, 139) | REED-SOLOMON | 8 BYTES | 155 BYTES | 139 BYTES | 16 BYTES |
| | RS-8 (105, 89) | REED-SOLOMON | 8 BYTES | 105 BYTES | 89 BYTES | 16 BYTES |
| | RS-8 (55, 39) | REED-SOLOMON | 8 BYTES | 55 BYTES | 39 BYTES | 16 BYTES |

| FEC CODE | BER IMPROVEMENT (FROM BER BEFORE CORRECTION TO BER AFTER CORRECTION) | CIRCUIT SCALE (RELATIVE VALUE) |
|---|---|---|
| RS-8 (255, 239) | $7 \times 10^{-3} \rightarrow 7 \times 10^{-3} \quad 7 \times 10^{-3} \rightarrow 1 \times 10^{-6}$ | 1 (REFERENCE) |
| RS-16 (255, 223) | $7 \times 10^{-3} \rightarrow 2 \times 10^{-3} \quad 7 \times 10^{-3} \rightarrow 4 \times 10^{-13}$ | DOUBLED |
| RS-8 (127, 111) | $7 \times 10^{-3} \rightarrow 2 \times 10^{-3} \quad 7 \times 10^{-3} \rightarrow 7 \times 10^{-9}$ | UNCHANGED |
| RS-8 (40, 24) | $7 \times 10^{-3} \rightarrow 7 \times 10^{-6} \quad 7 \times 10^{-3} \rightarrow 8 \times 10^{-13}$ | UNCHANGED |

| FEC CODE | CODE FORMAT | MULTIPLEX CORRECTION | CODE LENGTH | INFORMATION QUANTITY | REDUNDANCY | DISTANCE BETWEEN ONT AND OLT |
|---|---|---|---|---|---|---|
| RS-8 (255, 239) | REED-SOLOMON | 8 BYTES | 255 BYTES | 239 BYTES | 16 BYTES | 0 km TO 20 km |
| RS-8 (205, 189) | REED-SOLOMON | 8 BYTES | 205 BYTES | 189 BYTES | 16 BYTES | 20 km TO 21 km |
| RS-8 (155, 139) | REED-SOLOMON | 8 BYTES | 155 BYTES | 139 BYTES | 16 BYTES | 21 km TO 22 km |
| RS-8 (105, 89) | REED-SOLOMON | 8 BYTES | 105 BYTES | 89 BYTES | 16 BYTES | 22 km TO 24 km |
| RS-8 (55, 39) | REED-SOLOMON | 8 BYTES | 55 BYTES | 39 BYTES | 16 BYTES | 24 km TO 30 km |

| FEC CODE | CODE FORMAT | MULTIPLEX CORRECTION | CODE LENGTH | INFORMATION QUANTITY | REDUNDANCY | BER BETWEEN ONT AND OLT |
|---|---|---|---|---|---|---|
| RS-8 (255, 239) | REED-SOLOMON | 8 BYTES | 255 BYTES | 239 BYTES | 16 BYTES | LESS THAN $1.0 \times 10^{-3}$ |
| RS-8 (205, 189) | REED-SOLOMON | 8 BYTES | 205 BYTES | 189 BYTES | 16 BYTES | $1.0 \times 10^{-3}$ TO $1.2 \times 10^{-3}$ |
| RS-8 (155, 139) | REED-SOLOMON | 8 BYTES | 155 BYTES | 139 BYTES | 16 BYTES | $1.2 \times 10^{-3}$ TO $1.5 \times 10^{-3}$ |
| RS-8 (105, 89) | REED-SOLOMON | 8 BYTES | 105 BYTES | 89 BYTES | 16 BYTES | $1.5 \times 10^{-3}$ TO $2 \times 10^{-3}$ |
| RS-8 (55, 39) | REED-SOLOMON | 8 BYTES | 55 BYTES | 39 BYTES | 16 BYTES | $2 \times 10^{-3}$ TO $4 \times 10^{-3}$ |

211  212  213  214  215  216  218

OPTICAL ACCESS SYSTEM

CLAIM OF PRIORITY

The present application claims priority from Japanese patent application serial no. 2009-125270, filed on May 25, 2009, the content of which is hereby incorporated by reference into this application.

BACKGROUND OF THE INVENTION

The present invention relates to an optical access system for providing communication between a subscriber's home and a communication common carrier's office and more particularly to an optical access system using an error correcting code.

Public telecommunication networks for transferring data such as voice and images include an access network for accommodating users to offices. A telephone subscriber network and ADSL have been used as such access network. In recent years, an optical access system also began to be introduced.

Some optical access systems provide one-to-one connection between an office and a subscriber while others provide one-to-n connection therebetween. A PON (Passive Optical Network) optical access system is known as the optical access system for one-to-n communication.

The PON optical access system allocates one optical wavelength to each of upstream and downstream. The system provides data communication between an optical line terminal (OLT) and multiple optical network terminals (ONTs) while sharing a band. A downstream signal from an OLT 1 to an ONT 2 passes through an intermediate optical splitter that distributes an optical signal. The ONT 2 acquires only a signal addressed to itself for communication. The OLT 1 notifies the ONT 2 of timing to transmit an upstream signal. The ONT 2 transmits the signal to the OLT 1 at that timing. In this manner, multiple ONT 2 terminals share one wavelength to communicate with the OLT 1.

Such known optical access systems include B-PON (Broadband PON, see ITU-T Recommendation G.983.1, G.983.4), GE-PON (Gigabit Ethernet PON, see IEEE IEEE802.3ah), and G-PON (Gigabit capable PON, see ITU-T Recommendation G.984.1, G.984.4).

The PON system accommodate such signals as noncyclic signals flowing through the Internet such as Web and mail, cyclic signals communicated through telephone networks or leased line networks, and signals at approximately constant bit rates such as video signals.

With reference to FIG. 1, the following describes an optical access system according to the related art. As shown in FIG. 1, an optical access network is configured between an OLT 1A, an ONT 2A-1, and an ONT 2A-2. Each ONT 2A and the OLT 1A are connected via an optical splitter 3. The ONT 2A is connected to an IP system 4. The OLT 1A is connected to an IP network 5. The IP network 5 accommodates a signal from the IP system 4 via the optical access network.

The splitter 3 and the ONT 2A are installed in a house or a building. A distance to the house or the building depends on the ONT 2A. That is, a distance between the OLT 1A and the ONT 2A depends on each ONT 2A within an allowable range. To solve this problem, the OLT 1A performs a ranging process to measure a distance to the ONT 2A and corrects an upstream signal phase. When the OLT 1A starts the ranging process, each ONT 2A immediately returns a signal to perform the ranging process. The OLT 1A corrects the phase assuming that the response time (delay time) from each ONT 2A corresponds to the distance. Using the phase correction, the OLT 1A ensures consistency between the time recorded in itself and the time recorded in the ONT 2A based on respective distance differences. Accordingly, the OLT 1A and all ONT 2A terminals can share an upstream time slot. The OLT 1A provides each ONT 2A with a communication timing and a band, that is, a start position and a stop position in the upstream time slot. Each ONT 2A transmits a signal to a communication path at the specified timing. This avoids collision between upstream signals transmitted from the ONT 2A terminals.

GE-PON and G-PON use an 8-byte correction Reed-Solomon (255, 239) code as the error correction code or the forward error correction (FEC) code for improving the communication quality.

The technology disclosed in Japanese Patent Laid-Open 2006-014228 selects an FEC code for each ONT 2A in accordance with a communication distance between the OLT 1A and the ONT 2A irrespectively of the Reed-Solomon (255, 239) code. The technology disclosed in Japanese Patent Laid-Open 2008-306434 allocates a band in consideration for FEC redundancy. Japanese Patent Laid-Open 2008-060820 and 2008-148245 disclose OLT and ONT as terminals that can be miniaturized.

With reference to FIG. 2, the following describes an FEC code selected for each ONT in the optical access system. For downstream communication as shown in FIG. 2, the OLT LA communicates with the ONT 2A-1 using FEC code (A), with the ONT 2A-2 using FEC code (B), and with the ONT 2A-3 using FEC code (C). In communication with the ONT 2A, the OLT 1A uses an FEC code having correction capability corresponding to the communication distance or the communication quality. It is assumed that the communication distance between the OLT 1A and the ONT 2A decreases or the original communication quality improves in the order of the ONT 2A-1, the ONT 2A-2, and the ONT 2A-3. The OLT 1A accordingly uses FEC code (A), FEC code (B), and FEC code (C) in the descending order of error correction capabilities. In response, the ONT 2A-1 through the ONT 2A-3 respectively use the allocated FEC code (A), FEC code (B), and FEC code (C) to decode the addressed signals.

For upstream communication as shown in FIG. 2, the ONT 2A-1 uses FEC code (D) for communication with the OLT 1A. Similarly, the ONT 2A-2 uses FEC code (E) for communication with the OLT 1A. The ONT 2A-3 uses FEC code (F) for communication with the OLT 1A. Each ONT 2A communicates with the OLT 1A using an FEC code having correction capability corresponding to the communication distance or the communication quality. It is assumed that the communication distance between the OLT 1A and the ONT 2A decreases or the original communication quality improves in the order of the ONT 2A-1, the ONT 2A-2, and the ONT 2A-3. The ONT 2A terminals accordingly use FEC code (D), FEC code (E), and FEC code (F) in the descending order of error correction capabilities. In response, the OLT 1A uses FEC code (D), FEC code (E), and FEC code (F) to decode signals.

The OLT 1A notifies the ONT 2A of FEC code allocation to each ONT 2A using an overhead for downstream communication, as will be described later. Similarly, the OLT 1A notifies the ONT 2A of upstream communication from the ONT 2A to the OLT 1A using an overhead for downstream communication.

The FEC code is selected in accordance with the communication distance or the communication quality between the OLT 1 and the ONT 2 so as to adjust the error correction capability for each ONT 2. The FEC code redundancy or the number of check bits varies with the error correction capability. The redundancy can be controlled in accordance with the error correction capability needed for each ONT 2 and bands can be used effectively in comparison with a case of allocating the most efficient (most highly redundant) FEC code to all ONT 2 terminals in common. When the FEC code is selected for each ONT 2, however, it is necessary to use multiple FEC codes having different FEC code formats and error correction capabilities. The FEC code formats include Reed-Solomon, BCH, and convolution code and require calculations based on specific algorithms. Increasing the error correction capability of the code also increases the number of FEC check bits (redundancy). As a result, FEC code lengths also differ from each other.

Consequently, the OLT 1 and the ONT 2 need to be provided with multiple hardware components such as FEC encoder/decoder circuits for processing FEC codes. In addition, the OLT 1 and the ONT 2 require the band allocation in consideration for different code lengths and redundancies.

When FEC codes are carefully selected in accordance with the communication distance and the communication quality, many types of hardware are needed so as to minimize unnecessary FEC redundancy and maximize the band usability. The OLT 1 needs to calculate the band allocation to the ONT 2 in consideration for many FEC code combinations.

The band is allocated as follows. The ONT 2 notifies the OLT 1 of the stored amount of upstream data. The OLT 1 calculates a bandwidth capable of transmission from the ONT 2. The OLT 1 notifies the ONT 2 of the bandwidth. The ONT 2 and the OLT 1 perform the calculation and the notification as real-time processing. When the calculation also uses the FEC redundancy as a necessary factor, the OLT 1 requires more complicated calculation for more combinations of FEC codes. This delays the response time for the band allocation.

Installing many types of hardware such as different FEC encoder/decoder circuits increases prices of the OLT 1 and the ONT 2. The hardware scale increases as many FEC codes with high correction capabilities are used. This also increases prices of the OLT 1 and the ONT 2.

The optical splitter splits downstream PON signals. When the FEC code is selected for each ONT 2, multicast (or broadcast) may be used to transmit the same signal to multiple ONT 2 terminals and an overhead is transmitted to all ONT 2 terminals in common. Such multicast and overhead are inappropriate for FEC processing. For example, let us suppose that FEC (C) selected for the ONT 2-3 is used to encode and multicast data. The ONT 2-3 can correctly decode the data. However, the ONT 2-1 cannot correctly decode the data because FEC (A) is selected for the ONT 2-1. On the other hand, the band usability degrades when the same data is encoded with FEC (A) for ONT 2-1 and with FEC (C) for the ONT 2-3 and both data are transmitted over a downstream signal. That is, the effect of selecting the FEC code for each ONT 2 decreases.

SUMMARY OF THE INVENTION

The present invention provides an optical access system capable of efficiently using a band between an optical line terminal and multiple optical network terminals.

To solve the above-mentioned problem, there is provided an optical access system including an optical line terminal and multiple optical network terminals. The optical line terminal and the optical network terminal each include an FEC code table for storing FEC code candidates to be used. The optical line terminal includes a band calculation section that uses the FEC code table to calculate an area assigned to communication with the optical network terminal.

To solve the problem, there is provided the optical line terminal that selects an FEC code used for communication with the optical network terminals from stored FEC code candidates based on one of a distance and communication quality between the optical line terminal and the optical network terminal.

To solve the problem, there is provided the optical network terminal uses a grant band and an FEC code notified from the optical line terminal to divide an upstream PON frame into plural FEC code lengths for encoding and transmits the upstream PON frame to the optical line terminal.

The present invention can provide an optical access system capable of efficiently using a band between an optical line terminal and multiple optical network terminals.

BRIEF DESCRIPTION OF THE DRAWINGS

Preferred embodiments of the present invention will now be described in conjunction with the accompanying drawings, in which;

FIG. 8 illustrates the configuration of an FEC code table;

FIG. 10 illustrates an effect of decreasing FEC codes;

FIG. 11A illustrates one configuration of the FEC code table;

FIG. 11B illustrates another configuration of the FEC code table;

DETAILED DESCRIPTION OF THE PREFERRED EMBODIMENTS

Figure 1:
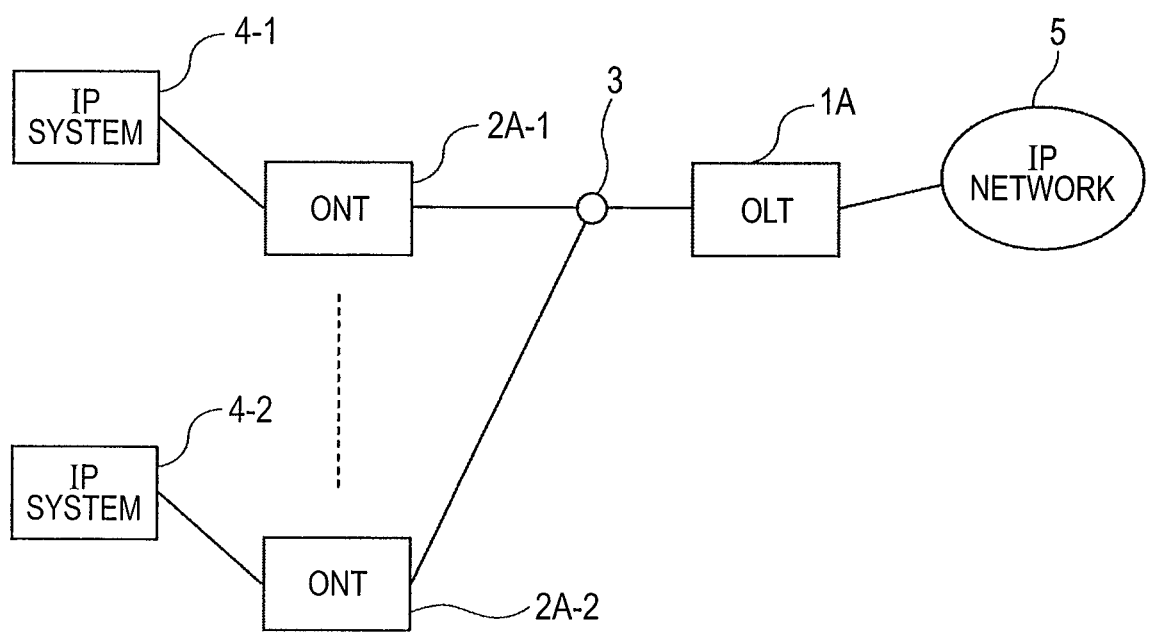
FIG. 1 is a block diagram showing an optical access system.
Figure 2:
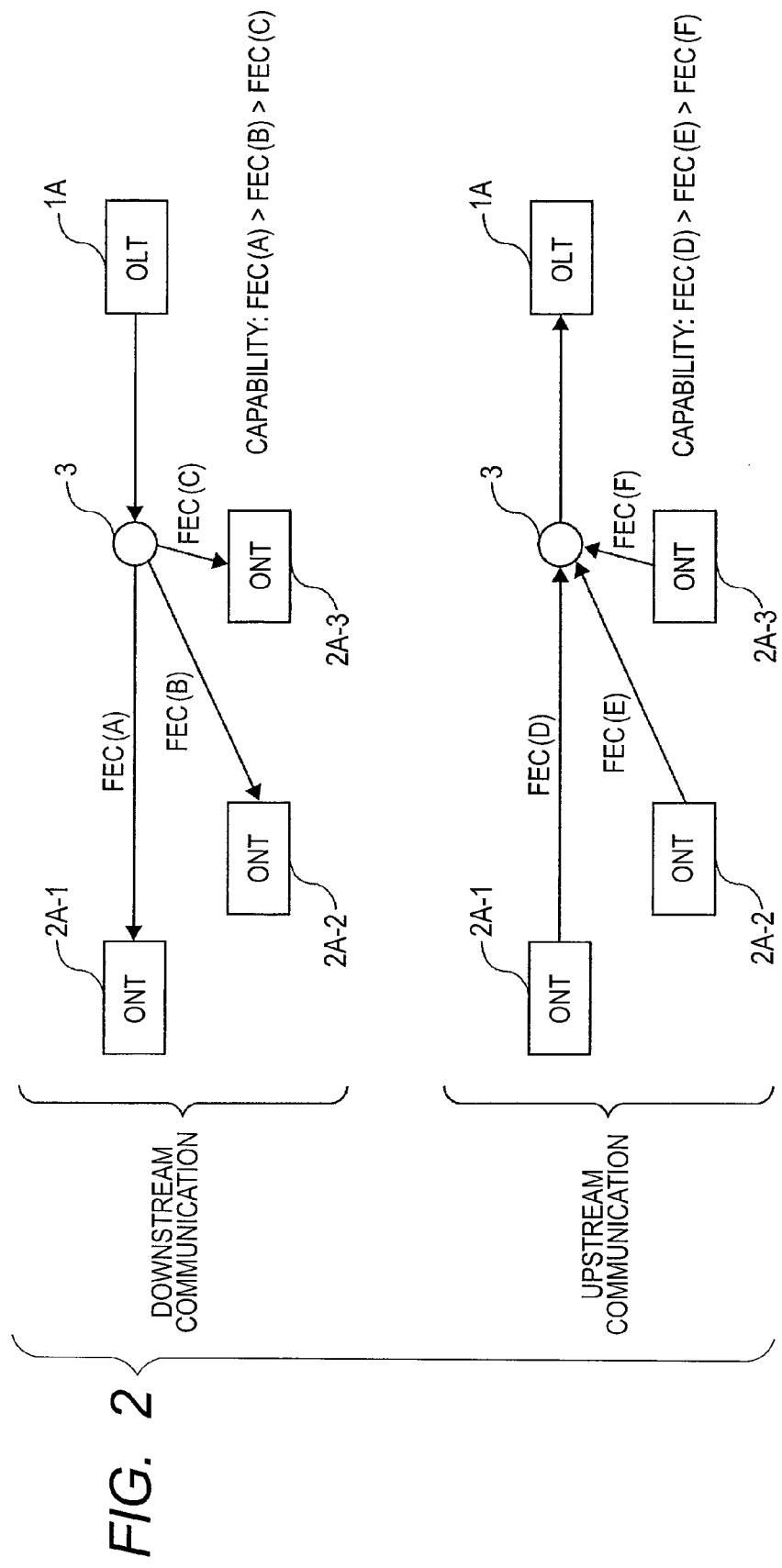
FIG. 2 is a block diagram showing an optical access system using FEC codes.

Embodiments will be described in further detail with reference to the accompanying drawings. The same parts or components are depicted by the same reference numerals and a detailed description is omitted for simplicity. G-PON will be described as a PON system while the other PON systems may also be applicable. The Reed-Solomon code will be described as an FEC code while the other FEC codes may also be applicable. The following description assumes an organization code that does not process original information and only supplies a check bit.

In a Reed-Solomon (n, k) code, n denotes a code length and k denotes an information length to be encoded. An FEC check bit is equivalent to a difference between n and k. The information length k is free from encoding and remains unchanged. Normally, n and k are expressed in units of eight bits (one byte). When the code length exceeds 255, the unit is extended to the dimension of a Galois field that is used as the base for the code. Specifically, the unit is extended to ten bits for the code length up to 1023 and to 12 bits for the code length up to 4095. The following description uses a simplified form of RS-h (n, k) code to represent the Reed-Solomon (n, k) code capable of correcting h bytes.

Figure 3:
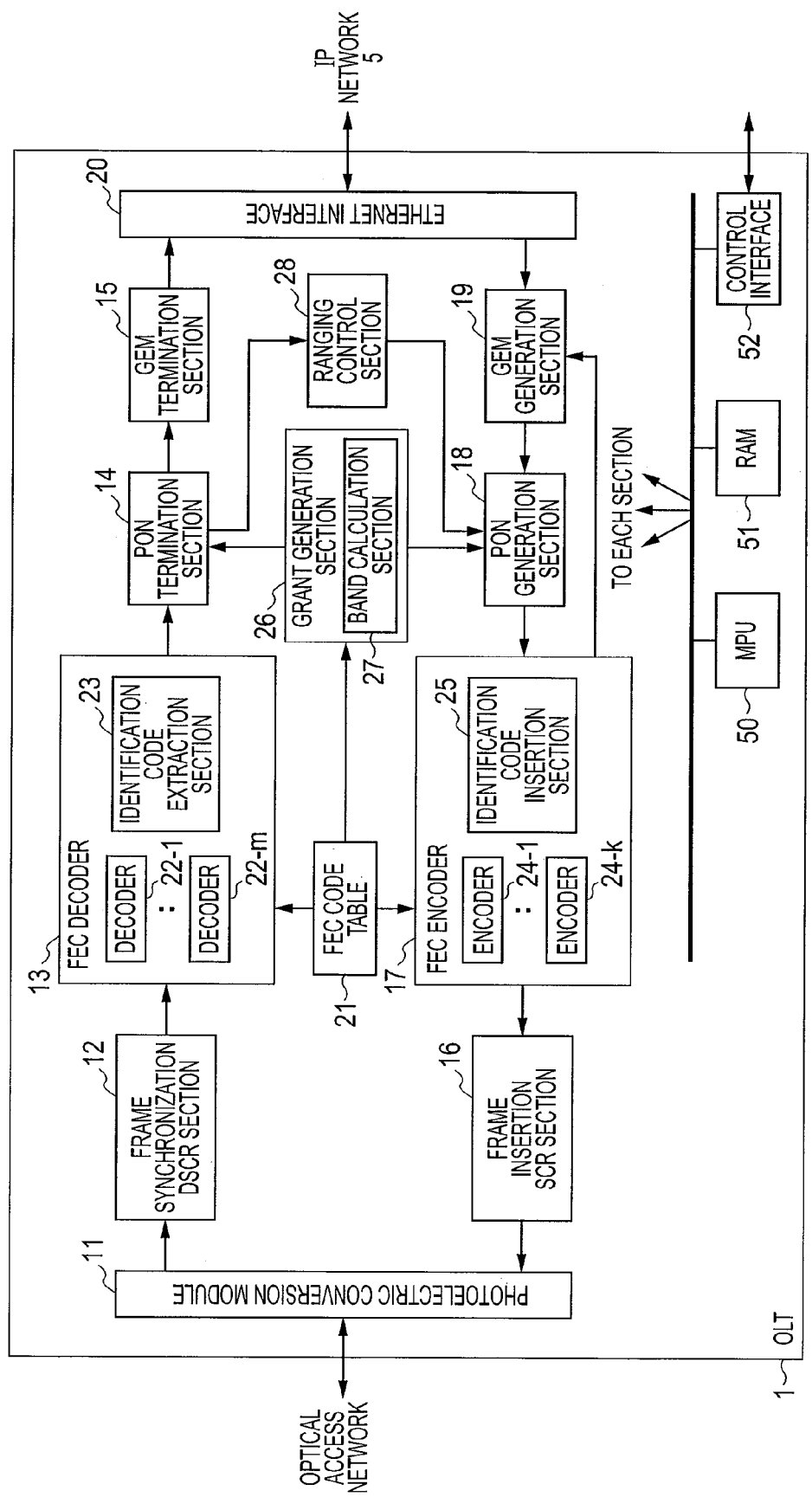
FIG. 3 is a block diagram showing an optical line terminal (OLT)

The OLT configuration will be described with reference to FIG. 3. In FIG. 3, an OLT 1 includes a photoelectric conversion module 11, a frame synchronization descramble (DSCR) section 12, an FEC decoder 13, a PON termination section 14, a generic encapsulation method (GEM) termination section 15, a frame insertion scramble (SCR) section 16, an FEC encoder 17, a PON generation section 18, a GEM generation section 19, an Ethernet interface (IF) 20, an FEC code table 21, a grant generation section 26, a ranging control section 28, a micro-processing unit (MPU) 50, a RAM 51, and a control interface 52.

The FEC decoder 13 includes m decoder circuits 22 and an identification code extraction section 23. The FEC encoder 17 includes k encoder circuits 24 and an identification code insertion section 25. The grant generation section 26 includes a band calculation section 27.

The photoelectric conversion module 11 converts an upstream signal from the optical access network into an electric signal. The frame synchronization DSCR section 12 synchronizes electric signal frames. The frame synchronization DSCR section 12 descrambles a signal that is scrambled by the ONT 2 as a transmission origin. The FEC decoder 13 corrects an error. The PON termination section 14 terminates a PON overhead. The GEM termination section 15 resumes the original Ethernet frame from a GEM packet. The Ethernet interface 20 transmits an Ethernet frame to the IP network 5.

The Ethernet interface 20 receives a downstream signal from the IP network 5. The GEM generation section 19 generates a GEM packet that is equivalent to an encapsulated Ethernet frame. The PON generation section 18 generates a PON frame. The FEC encoder 17 supplies an FEC parity. The frame insertion SCR section 16 inserts a frame synchronization signal into a PON overhead. The frame insertion SCR section 16 also scrambles signals. The photoelectric conversion module 11 converts an electric signal into an optical signal and transmits it to the optical access network.

The FEC code table 21 previously stores FEC code parameters such as code types, code lengths, and redundancies. The FEC decoder 13 and the FEC encoder 14 use the parameters as candidates.

The encoder circuit 24 in the FEC encoder 17 encodes FEC codes stored in the FEC code table 21 by calculating a check bit and supplying it to the original signal. The encoder circuit 24 selectively uses the code for each signal supplied to the ONT 2. When an identification code indicates the FEC code used for encoding a signal, the identification code insertion section 25 inserts that identification code at a specified position in the PON frame.

Similarly, the decoder circuit 22 in the FEC decoder 13 also decodes FEC codes stored in the FEC code table 21 by correcting an error and deleting the check bit. The decoder circuit 22 selectively uses the code for each signal supplied to the ONT 2. The identification code extraction section 23 separates and extracts an identification code indicating the FEC code used to encode signals in the ONT 2 as a transmission origin. This identification code is also used to select decoder circuits 22-1 through 22-m in the FEC decoder 13. Alternatively, the MPU 50 or the control interface 52 may directly select the decoder circuits.

The FEC encoder 17 and the FEC decoder 13 selectively activate the encoder circuit 24 and the decoder circuit 22 for the ONT 2 at a time or for each GEM contained in it based on an identification code to be described later with reference to FIGS. 5 and 6. The FEC encoder 17 further processes overheads in the downstream PON frame using the encoder circuit 24 that handles FEC codes for overhead. The FEC encoder 17 processes multicast signals using the encoder circuit 24 that handles FEC codes for multicast.

The grant generation section 26 generates grant information that permits each ONT 2 to perform upstream communication. The grant information includes an ONT 2 identification number, communication timing and band, and CRC (Cyclic Redundancy Check). The PON generation section 18 transmits the grant information along with a downstream PON frame.

An upstream communication band for each ONT 2 is chronologically constant but is dynamically variable. The band calculation section 27 in the grant generation section 26 calculates a grant band to be allocated to ONT 2 in accordance with a specified algorithm. The band calculation section 27 calculates a band in consideration for the FEC redundancy. For the band calculation, the band calculation section 27 references the FEC code table 21 to acquire parameters (code type, code length, and redundancy) of the FEC code. The band calculation will be described later with reference to FIG. 13.

Alternatively, the MPU 50 or the control interface 52 may directly specify the grant information. In such case, the MPU 50 or an external unit performs the calculation similar to that of the band calculation section 27.

The generation section 26 transmits the grant information also to the upstream PON termination section 14. The PON termination section 14 previously recognizes the actual timing of reception from the ONT 2. The grant generation section 26 may notify the frame synchronization DSCR section 12 of the grant information so as to wait at the reception timing.

The MPU 50 and the RAM 51 are used for control over the OLT 1 as a whole. The control interface 52 allows the OLT 1 to be configured from outside.

The ranging control section 28 allows the PON generation section 18 to initiate a ranging process between the OLT 1 and the ONT 2 at a specified timing. The PON generation section 18 generates a ranging signal corresponding to the specific ONT 2 and transmits the ranging signal to the optical access network via the photoelectric conversion module 11. The ONT 2 receives the ranging signal and returns a response to the ranging control section 28 via the PON termination section 14 while the delay time is measured. The ranging process is complete upon measuring the delay time with respect to all ONT 2 terminals.

Figure 4:
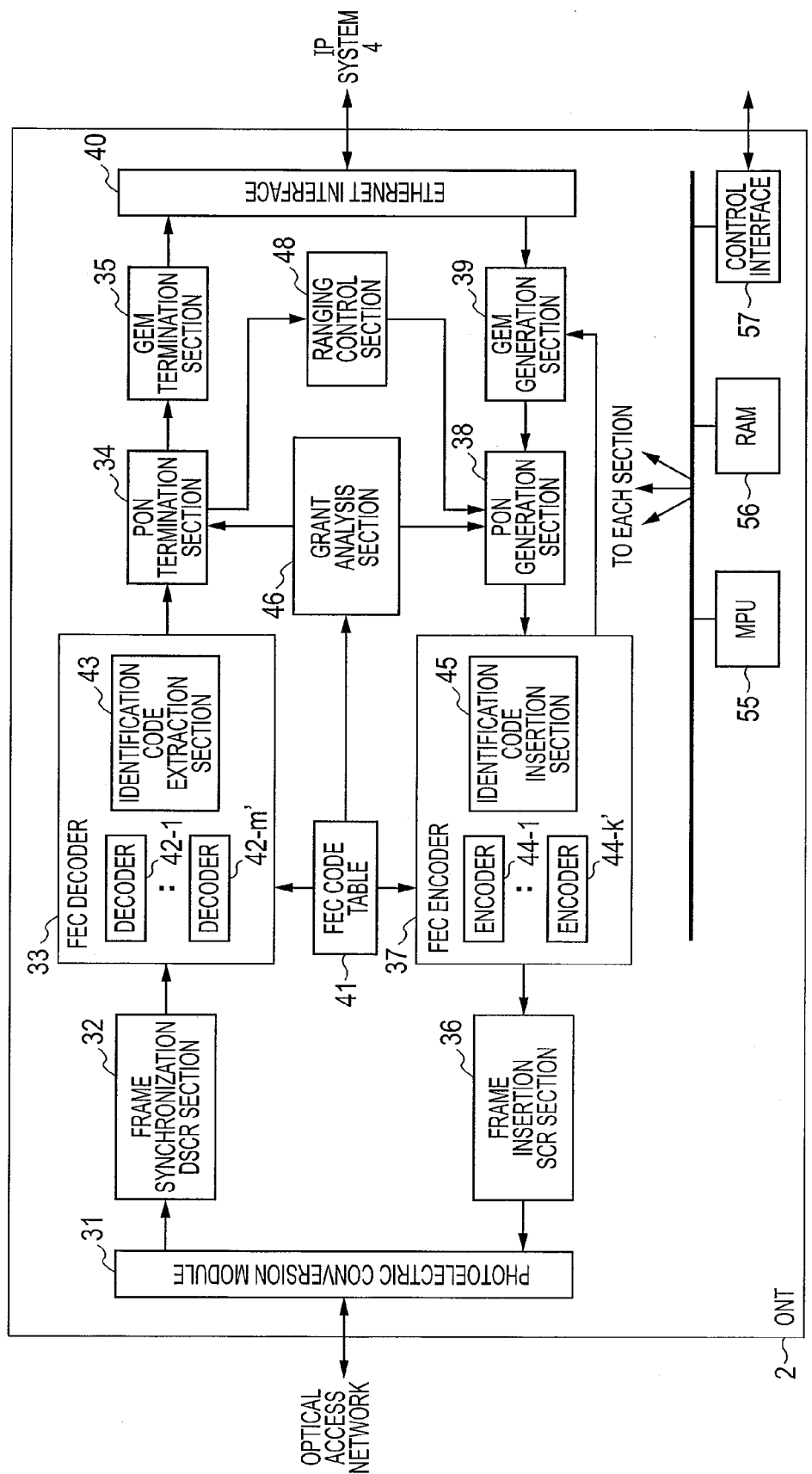
FIG. 4 is a block diagram showing an optical network terminal (ONT)

The ONT configuration will be described with reference to FIG. 4. As shown in FIG. 4, the ONT 2 includes a photoelectric conversion module 31, a frame synchronization DSCR section 32, an FEC decoder 33, a PON termination section 34, a GEM termination section 35, a frame insertion SCR section 36, an FEC encoder 37, a PON generation section 38, a GEM generation section 39, an Ethernet IF 40, an FEC code table 41, a grant analysis section 46, a ranging control section 48, an MPU 55, a RAM 56, and a control interface 57.

The FEC decoder 33 includes m' decoder circuits 42 and an identification code extraction section 43. The FEC encoder 37 includes k' encoders 44 and an identification code insertion section 45.

The photoelectric conversion module 31 converts a downstream signal (optical signal) from the optical access network into an electric signal. The frame synchronization DSCR section 32 synchronizes electric signal frames. The frame synchronization DSCR section 32 descrambles a signal that is scrambled in the OLT 1 as a transmission origin. The FEC decoder 33 corrects a transmission error. The PON termination section 34 terminates a PON overhead. The GEM termination section 35 resumes the original Ethernet frame from a GEM packet. The Ethernet interface 40 transmits a resumed Ethernet frame to the IP system 4.

The Ethernet interface 40 receives an upstream signal from the IP system 4. The GEM generation section 39 generates a GEM packet that is equivalent to an encapsulated Ethernet frame. The PON generation section 38 generates a PON frame. The FEC encoder 37 supplies an FEC parity. The frame insertion SCR section 36 inserts a frame synchronization signal into a PON overhead. The frame insertion SCR section 36 scrambles signals. The photoelectric conversion module 31 converts a scrambled electric signal into an optical signal and transmits it to the optical access network.

The FEC code table 41 previously stores FEC code parameters such as code types, a code lengths, and redundancies. The FEC decoder 33 and the FEC encoder 34 use the parameters as candidates.

The encoder circuit 44 in the FEC encoder 37 encodes FEC codes stored in the FEC code table 41 by calculating a check bit and supplying it to the original signal. The encoder circuit 44 selectively uses the code for each signal supplied to the OLT 1. When an identification code indicates the FEC code used for encoding a signal, the identification code insertion section 45 inserts that identification code at a specified position in the PON frame.

Similarly, the decoder circuit 22 in the FEC decoder 33 also decodes FEC codes stored in the FEC code table 41 by correcting an error and deleting the check bit. The decoder circuit 22 selectively uses the code for each signal supplied to the OLT 1. The identification code extraction section 43 separates and extracts an identification code indicating the FEC code used to encode signals in the OLT 1 as a transmission origin. This identification code is also used to select decoder circuits 42-1 through 42-m' in the FEC decoder 33. Alternatively, the MPU 55 or the control interface 57 may directly select the decoder circuits 42.

The FEC decoder 33 and the FEC encoder 37 selectively activate the encoder circuit 44 and the decoder circuit 42 for the ONT 2 at a time or for each GEM contained in it based on an identification code to be described later with reference to FIGS. 5 and 6. The FEC decoder 33 further processes overheads in the downstream PON frame using the decoder circuit 42 that handles FEC codes for overhead. The FEC decoder 33 processes multicast signals using the decoder circuit 42 that handles FEC codes for multicast.

The grant analysis section 46 analyzes the grant information (ONT 2 identification number, communication timing, and band) that is separated in the PON termination section 34 and is transmitted to the corresponding ONT 2. The grant analysis section 46 then notifies the PON generation section 38 of the grant information. At the specified communication timing, the PON generation section 38 transmits a generated PON frame to the optical access network via the photoelectric conversion module 31, for example. When generating a PON frame, the PON generation section 38 references the FEC code table 41 to acquire FEC code parameters (code type, code length, and redundancy) and generates an FEC check bit area in the PON frame.

The MPU 55 and the RAM 56 are used for control over the ONT 2 as a whole. The control interface 57 allows the ONT 2 to be configured from outside.

When the corresponding OLT 1 requests a ranging process, the PON termination section 34 transfers the received ranging request signal to the ranging control section 48. The ranging control section 48 then returns a ranging reception signal from the PON generation section 38. In this manner, the ranging process in the ONT 2 terminates.

The downstream PON frame will be described with reference to FIG. 5. As shown in FIG. 5, a downstream PON frame 101 includes an overhead 112 and a payload 114. The overhead 112 includes an upstream FEC information section 118, an OH-downstream FEC identification code section 102, an upstream grant information section, and an FEC check bit 115. The payload 114 includes multiple GEM frames. A GEM frame transmitted to ONT 2-1 includes a GEM header and a GEM payload. The GEM header includes a payload length indicator (PLI) area 106, a PortID area 105, a payload type (PTY) area 108, a header error control (HEI) area 109, and a GEM-downstream identification code area 103. The GEM payload includes an FEC check bit 107 at the end. The GEM frames include a GEM 104 for ONT management and control interface (OMCI). The GEM 104 for OMCI provides the GEM header with a GEM-downstream FEC identification code 117 and provides the GEM payload with a downstream FEC information section 116 and an upstream FEC information section 119. The upstream FEC information section 118 is associated with all ONT 2-1 through ONT 2-32. The OH-downstream FEC identification code section 102 includes a downstream FEC information section associated with all ONT 2-1 through ONT 2-32, a downstream FEC information section 110 for multicast, and a downstream FEC information section 113 for OH. The downstream FEC information section 110 for multicast includes a downstream FEC information section 111 for multicast corresponding to each multicast group.

The OLT notifies the ONT of any of the following identification codes for FEC codes used for the downstream communication: (1) the OH-downstream FEC identification code 102 in the overhead of the downstream PON frame 101; (2) the GEM-downstream FEC identification code 103 in the payload; and (3) the OMCI GEM 104 for FEC selection.

In GE-PON, a downstream PON frame as well as an upstream frame is independently transmitted to the ONT 2. In this case, the FEC encoder 17 encodes PON frames in accordance with each OLT frame of a specified unit in the frame. The identification code insertion section 25 inserts the identification code indicating the FEC code into the OH-downstream FEC identification code 102 in accordance with each downstream PON frame.

The ONT 2 determines whether or not each frame is transmitted to itself. The FEC decoder 33 decodes a PON frame transmitted to itself and ignores the other PON frames not transmitted to itself. The PON termination section 34 and the GEM termination section 35 discard the PON frames not transmitted to itself. One downstream PON frame may be multicast to multiple ONTs 2. In this case, the frame notifies an identification code corresponding to the FEC code used by the ONTs 2 for downstream communication or an identification code indicating that FEC is not used. The ONTs 2 may be all or some of the ONTs 2 connected to the OLT. The frame header describes whether or not the frame is multicast.

In G-PON, a downstream PON frame may include time-division multiplexed GEM frames to be transmitted to multiple ONTs 2. Each GEM is encoded and decoded. The payload 114 in the downstream PON frame 101 indicates the identification code position in this case. The details will be described below.

The FEC encoder 17 of the OLT 1 encodes time-division multiplexed GEM by selecting an FEC code corresponding to the ONT 2 as a destination for each GEM packet. The identification code insertion section 25 inserts the identification code indicating the FEC code into the OH-downstream FEC identification code 102 or the GEM-downstream FEC identification code 103.

When successive GEMs are transmitted to different ONTs 2, for example, the FEC code may need to be changed in accordance with each GEM. To do this, the FEC encoder 17 of the OLT 1 encodes FEC codes while acquiring parameters from the FEC code table 21 and successively selecting the encoder circuits 24-1 through 24-k. The number of FEC check bits accordingly varies with GEM in a real-time manner.

The GEM generation section 19 generates an FEC check bit area. The FEC encoder 17 transmits parameters (code length, information length, and redundancy) acquired from the FEC code table 21 to the GEM generation section 19. The GEM generation section 19 adjusts the GEM length so as to provide an FEC check bit area corresponding to the parameters.

The FEC decoder 33 of the ONT 2 corresponding to OLT 1 decodes received GEM transmitted to itself and ignores GEM not transmitted to itself. The PON termination section 34 and the GEM termination section 35 discards the ignored GEM. Since the GEM to be decoded is transmitted to the ONT 2 itself, the corresponding FEC identification code (or the configuration from outside) necessarily specifies one FEC code. Accordingly, the FEC decoder 33 continues to select the same decoder out of the decoders 41-1 through 41-m'. An exception is to intentionally change the FEC code as the PON system. The GEM termination section 35 of the ONT 2 discards the GEM header and the FEC check bit area in the GEM to recover the original Ethernet frame.

The GEM generation section 19 provides the GEM header. The GEM generation section 19 uses the PortID area 105 in the GEM header to indicate to which ONT 2 the GEM is transmitted. Specifically, the ONT 2 as a destination is indirectly indicated by previously determining to which ONT 2 the Port-ID number belongs. Alternatively, part of the PortID area 105 directly indicates the number of the ONT 2 as a destination. A general instruction is to previously determine rules of the PortID number or the correspondence to the ONT 2 across the PON system. The PLI area 106 in the GEM header indicates the length of the GEM including the FEC check bit area 107. The PTY area 108 indicates the GEM type, i.e., GEM for users or for OMCI. The HEC area 109 is used for packet synchronization for each GEM. As mentioned above, the identification code insertion section 25 provides the GEM-downstream identification code 103 in the GEM header.

The identification code of the FEC code is encoded for each GEM and is inserted into the OH-downstream FEC identification code area 102. Alternatively, that identification code is inserted into the GEM-downstream identification code area 103 provided for each GEM. The PON system previously needs to determine which area to be used.

The OH-downstream FEC identification code area 102 stores FEC identification codes corresponding to the ONT 2 so that the number of stored FEC identification codes is equivalent to that of ONTs 2. The payload contains multiplexed GEMs with different destinations. When there are 32 ONTs 2 as destinations in total, the OH-downstream FEC identification code area 102 stores 32 FEC identification codes.

The GEM-downstream identification code area 103 indicates which FEC code is used to encode the specific GEM independently of the others. The GEM-downstream identification code area 103 is provided for each GEM independently. The FEC identification code is provided in accordance with the ONT 2 as a destination for the GEM.

When one GEM may be multicast to multiple ONTs 2, the FEC code is predetermined to that effect. The frame provides an identification code indicating a multicast FEC code used in common with multiple ONTs 2 or an identification code indicating no use of FEC. When the OH-downstream FEC identification code 102 is used, its MC area 110 is provided with the identification code. When the GEM-downstream FEC identification code 103 is used, it is provided with a code indicating the destination ONT 2 for each specific GEM or the multicast.

The multicast is applicable to not only all ONTs 2 connected to the OLT 1 but also a group of ONTs 2. When the OH-downstream FEC identification code 102 is used, the MC area 110 is further divided into as many group-based MC areas 111 as the groups. Identification codes are provided for the MC areas 111.

The PortID area 105 in the GEM header indicates whether the GEM is multicast to all or groups of ONTs. Specifically, multiple ONTs 2 as destinations are indirectly specified by predetermining PortID numbers corresponding to the multicast to all or groups of ONTs. Alternatively, part of the PortID area 105 directly indicates the number of ONTs 2 such as "64" when the maximum number of available ONTs 2 is 32. Basically, the PON system needs to predetermine rules of the PortID number or the correspondence to the ONT 2.

One of the following techniques is used to notify the ONT of encode for the overhead area 112 in the downstream PON frame. (1) An FEC code is predetermined. (2) The overhead area 113 in the OH-downstream FEC identification code 102 is provided with an identification code indicating an overhead FEC code used in common with all ONTs 2 or an identification code indicating no use of FEC. The encode for the overhead is independent of the encode for GEM in the payload 114. Therefore, the GEM-downstream FEC identification code 103 is unavailable and the OH-downstream FEC identification code 102 is available. The FEC check bit is inserted into the FEC check bit area 115 at the end of the overhead. Only the overhead configures the FEC code. Unlike the GEM-based encode as mentioned above, the overhead is used for all ONTs 2 in common. For this reason, one FEC code needs to be used for all the ONTs 2 in common. The FEC code used for overhead needs to have the highest capability out of FEC codes selected for the ONTs 2. All the ONTs 2 can receive the overhead while ensuring the good quality.

The GEM generation section 19 generates the GEM 104 for OMCI. The identification code insertion section 25 provides the downstream FEC information 116. When the OMCI GEM 104 is used, the identification code insertion section 25 allows the downstream FEC information area 116 to store an FEC identification code used for the user GEM transmitted to the specific ONT 2 or an FEC identification code used for the user GEM multicast to some or all of the ONTs 2. The OMCI-based notification is included as part of the network management and indicates that GEM is transmitted to the specific ONT 2. Actually, the OMCI specifies that the GEM is to be transmitted to all ONTs 2. Based on this, the GEM is separately transmitted to all the ONTs 2. FIG. 5 shows the example of not FEC-encoding the OMCI GEM itself. The GEM-downstream FEC identification code 117 in the OMCI GEM indicates "FEC encode OFF." The OMCI GEM contains no FEC check bit. To enable the FEC encode, the GEM-downstream FEC identification code 117 indicates the identification code for the FEC code similarly to the normal GEM. The FEC check bit is placed at the end of the OMCI GEM.

Figure 6:
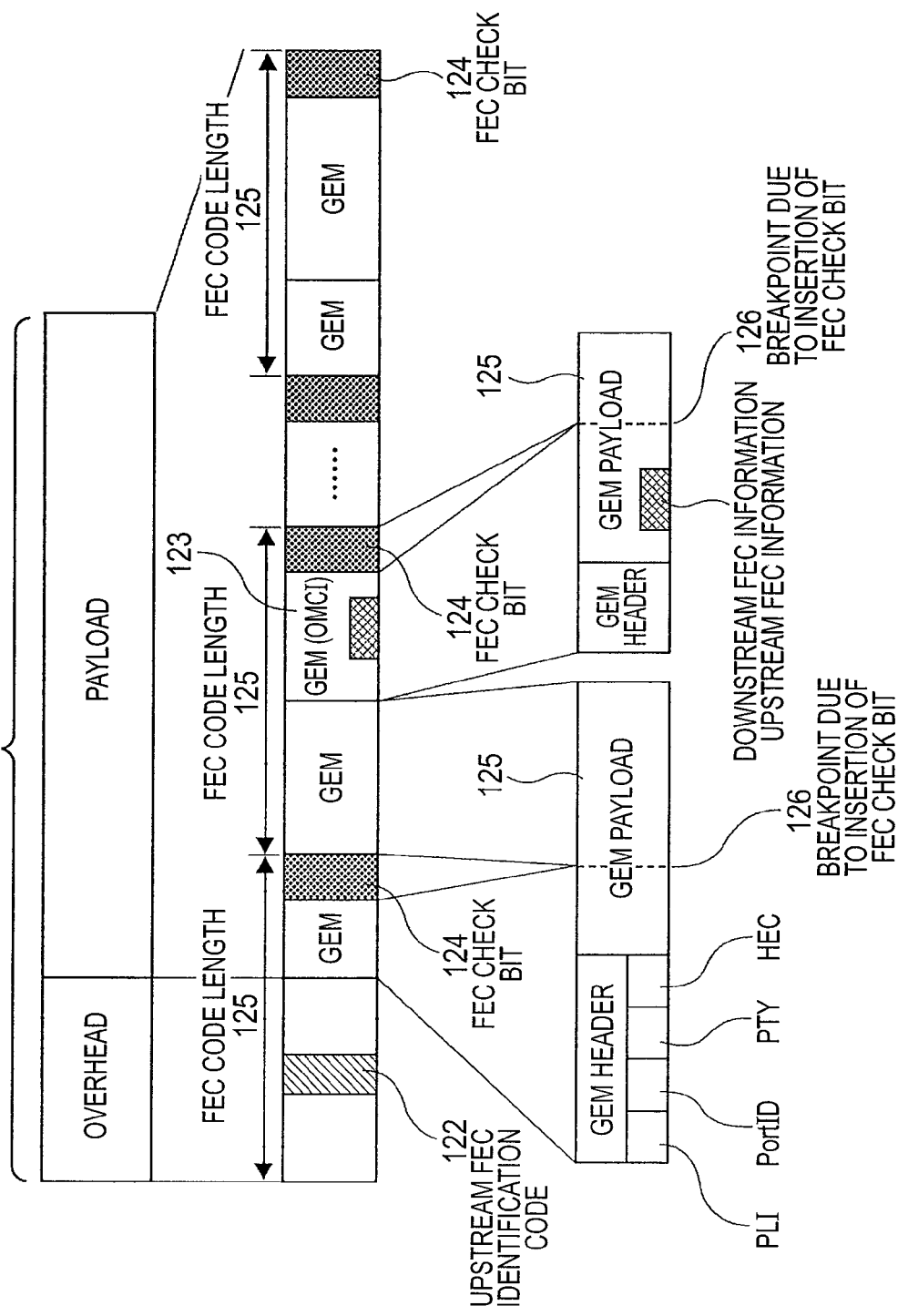
FIG. 6 illustrates the configuration of an upstream PON frame.

The following describes the upstream PON frame configuration with reference to FIG. 6. As shown in FIG. 6, an upstream PON frame 121 includes an overhead and a payload. The overhead includes an upstream FEC identification code 122. Let us suppose that the payload contains GEM and OMCI GEM from the beginning. When the FEC code length is 125 bytes, the first FEC code contains the overhead of the upstream PON frame 121, the GEM header of the first GEM, part of the GEM payload, and an FEC check bit 124. The next FEC code contains the latter half of the first GEM payload, the OMCI GEM header, part of the GEM payload, and the FEC check bit 124.

The GEM header contains a PLI area, a PortID area, a PTY area, and an HEC area. The GEM payload 125 contains a breakpoint 126 due to FEC check bit insertion. The breakpoint 126 may be contained in the GEM header. The GEM payload in the OMCI GEM contains a downstream FEC information area and an upstream FEC information area.

The FEC code identification code for upstream communication is available in two types. One specifies the FEC code to be used using a downstream PON frame from the OLT 1 to the ONT 2. The other uses an upstream PON frame to notify the OLT 1 of the FEC code that the ONT 2 actually uses for encoding. The latter identification code in the upstream PON frame may not be used when the specification from the OLT 1 is ensured.

Figure 5:
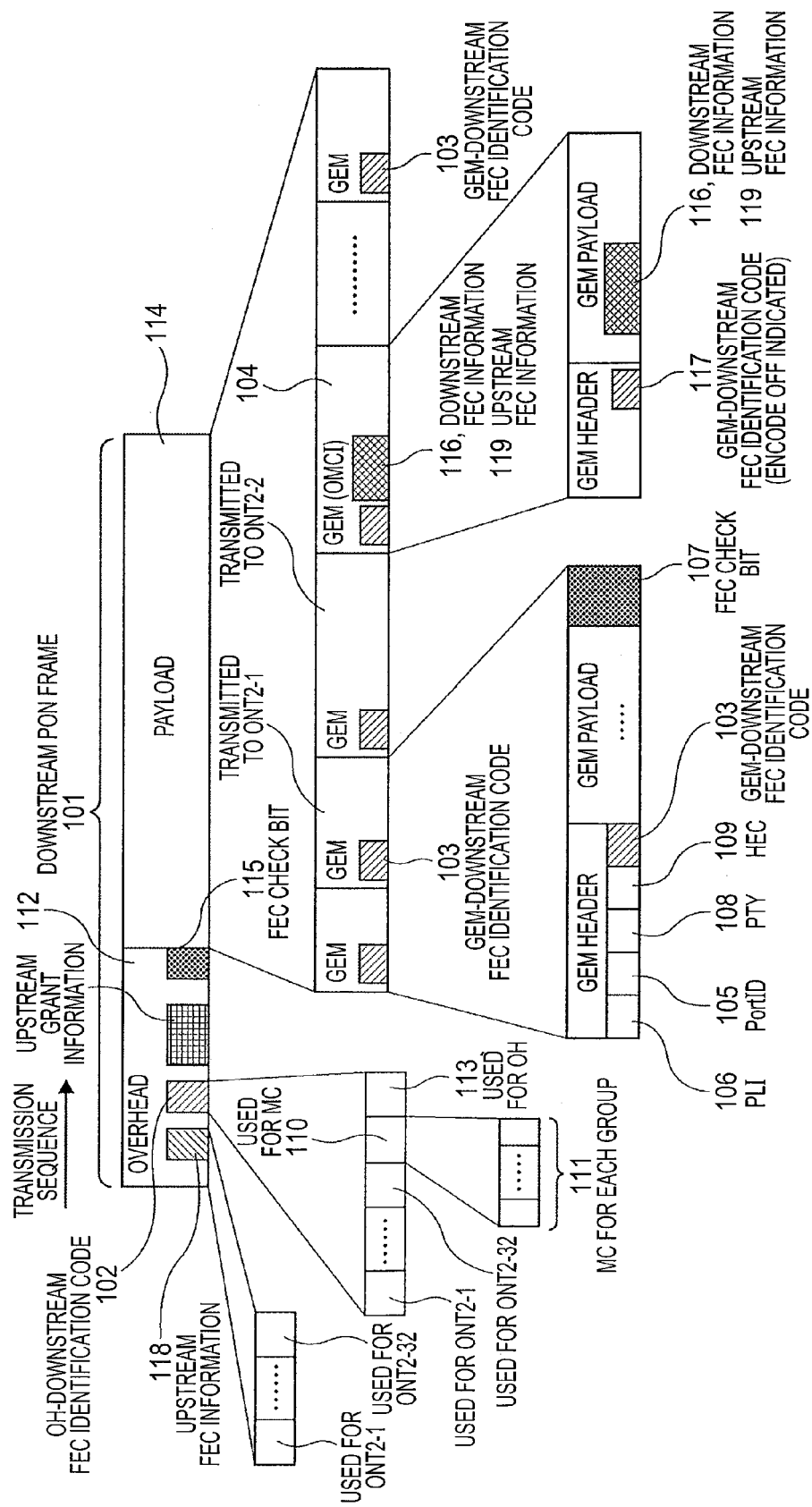
FIG. 5 illustrates the configuration of a downstream PON frame.

When a downstream PON frame from the OLT 1 to the ONT 2 specifies the FEC code to be used, the frame uses the upstream FEC information 118 contained in the overhead or the OMCI GEM 104 for FEC selection as shown in FIG. 5. The FEC code identification code is provided for each ONT 2. The downstream PON frame is separately transmitted to all ONTs 2.

GE-PON transmits one downstream PON frame from the OLT 1 only to the specific ONT 2. Such communication method indicates an identification code for the FEC code used by that specific ONT 2 for upstream communication or an identification code indicating no use of FEC.

According to G-PON, on the other hand, one downstream PON frame from the OLT 1 to the ONT 2 contains time-division multiplexed signals corresponding to all the ONTs 2. The frame includes areas for storing as many FEC code identification codes as the ONTs 2. FIG. 5 shows this case. When the OMCI GEM is used, the frame stores the FEC identification code for each ONT 2 as the upstream FEC information 119.

The ONT 2 uses the FEC encoder 37 to encode the upstream PON frame 121 in accordance with the FEC information 118 or 119 in the received downstream PON frame. The identification code insertion section 45 notifies the OLT 1 of the FEC code using the upstream FEC identification code 122 in the overhead or the OMCI GEM 123 for FEC selection in the payload. This is because all GEMs multiplexed in the payload of one upstream PON frame are transmitted from the same ONT 2 and the common FEC code may be used. Accordingly, each PON frame may use one identification code.

The FEC encoder 37 encodes the frame on GEM basis, in units of multiple GEMs, or on the basis of each upstream PON frame like G-PON. When encoding the frame on GEM basis, the FEC encoder 37 uses the FEC check bit for each GEM and starts new encode calculation on the next different GEM. When encoding the frame in units of multiple GEMs, the FEC encoder 37 uses the FEC check bit for each of multiple GEMs and starts new encode calculation on the next different GEMs. When encoding the frame on the basis of each upstream PON frame, the FEC encoder 37 uses the FEC check bit for the upstream PON frame and starts new encode calculation on the next different upstream PON frame. The GEM generation section 39 generates these FEC check bit areas. At this time, the FEC encoder 37 transmits parameters (code length, information length, and redundancy) acquired from the FEC code table 41 to the GEM generation section 39. The GEM generation section 39 adjusts the GEM length so as to ensure the FEC check bit area corresponding to the parameters. FIG. 6 shows an example of encoding each upstream PON frame. The FEC check bit 124 is stored at the end of a specified FEC code length into which the PON frame is divided.

The unit of GEMs is equivalent to ALLOC-ID whose band the upstream grant information specifies. ALLOC-ID is previously associated with the specific ONT 2. GEM is associated with ALLOC-ID via the Port-ID. Specifically, it is assumed that GEM having Port-IDs "100" and "110" belongs to ALLOC-ID "50." This ALLOC-ID is assumed to belong to the ONT 2 "10." A specified band (timing) is used to transmit multiple GEMs belonging to the specified ALLOC-ID "50." Accordingly, the band for the ALLOC-ID is equivalent to the band for one service of the ONT 2. Further, the ONT 2 may be provided with multiple ALLOC-IDs. In this case, ALLOC-IDs are associated with multiple services such as a service for always ensuring a specified band, a service for ensuring a minimal band, and a best-effort service for ensuring the band only when the communication traffic is light. As a result, the OLT 1 specifies the band on the basis of service (ALLOC-ID). The ONT 2 transmits the GEM belonging to the service (ALLOC-ID) to provide the corresponding service.

The GEM length or the upstream PON frame length may exceed the FEC code length. In this case, the ONT 2 segments the GEM or the upstream PON frame in units of FEC code lengths. The ONT 2 uses each of the segments as an FEC code area and newly starts the encode calculation for a different FEC code area.

FIG. 6 shows the example where the upstream PON frame is longer than the FEC code length. The FEC encode inserts the FEC check bit 124 at an interval of the FEC code length 125. The GEM is broken in the middle of the GEM payload 125. That is, the GEM is broken at the breakpoint 126 due to the FEC check bit insertion. The GEM may be broken in the middle of the GEM header. One GEM before the break can be restored because the OLT 1 deletes the FEC check bit 124 after the FEC decode. The overhead is also targeted for the FEC encode. The overhead including the subsequent GEM is equivalent to the first FEC code area.

The GEM header in the GEM, the OMCI GEM, and so on have the same meanings as those for the downstream communication and a description is omitted for simplicity.

Figure 7:
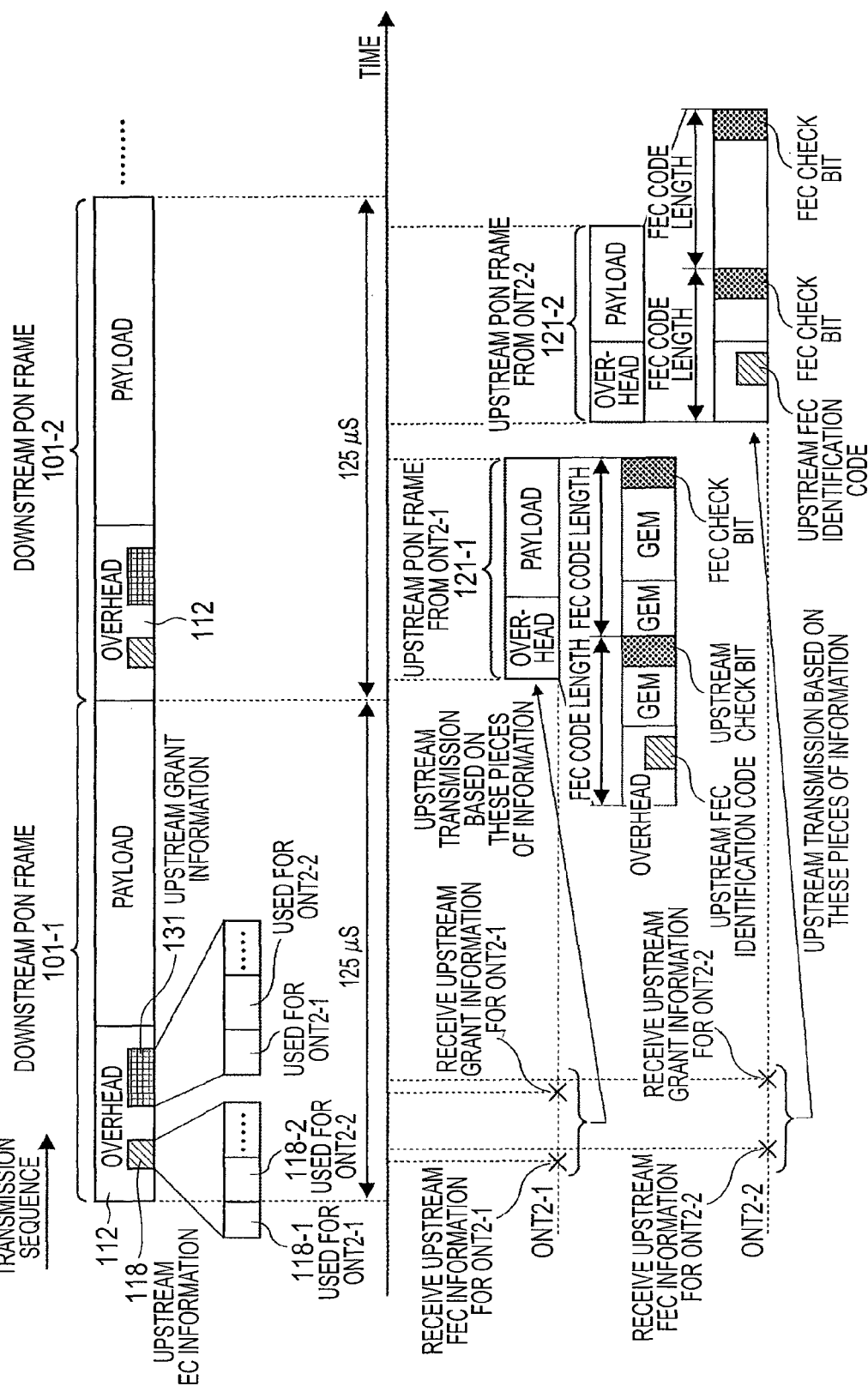
FIG. 7 illustrates timings for downstream PON frames and upstream PON frames.

With reference to FIG. 7, the following describes a process of allowing the ONT to initiate upstream transmission based on the upstream grant information and the upstream FEC information specified for downstream communication. FIG.

7 focuses on upstream FEC codes and ignores the FEC identification code, the FEC check bit, and the like for downstream communication.

FIG. 7 shows downstream PON frames 101-1 and 101-2 transmitted from the OLT 1. The frames are contiguous signals at a 125 µs cycle and are generated from a signal supplied to each ONT 2 based on time-division multiplexing. The ONT 2-1 and the ONT 2-2 receive the upstream FEC information 118 and upstream grant information 131 that are transmitted to themselves and contained in the overhead 112 of a downstream PON frame 101-1. The ONT 2-1 and the ONT 2-2 respectively transmit upstream PON frames 121-1 and 121-2 at the next 125 µs cycle.

The FEC encoder 37 in the ONT 2-1 selects and encodes an FEC code specified by upstream FEC code information 118-1 for the ONT 2-1 and transmits an upstream PON frame 121-1. Similarly, the FEC encoder 37 in the ONT 2-2 selects and encodes an FEC code specified by upstream FEC code information 118-2 for the ONT 2-2 and transmits an upstream PON frame 121-2. The upstream grant information 131-1 for the ONT 2-1 and the upstream grant information 131-2 for the ONT 2-2 specify transmission timing from the ONT 2-1 and transmission timing from the ONT 2-2 so as to prevent the timings from overlapping with each other. Relation between the upstream grant information 131 and the transmission timing will be described later with reference to FIG. 17. FIG. 7 shows an example where an FEC code specified for the ONT 2-2 is shorter than an FEC code specified for the ONT 2-1.

As described with reference to FIGS. 5 through 7, the FEC code is selectively used for each ONT 2 while information about the FEC code used is exchanged between the corresponding OLT 1 and the ONT 2. The FEC decode can be automatically performed based on this information.

With reference to FIG. 8, the following describes FEC code tables for the OLT and the ONT. As shown in FIG. 8, FEC code tables 21 and 41 include an FEC code 211, a code format 212, a multiplex correction 213, a code length 214, an information length 215, and redundancy 216.

A parent code and its child codes are used as candidates for FEC codes applicable to the OLT 1 and the ONT 2. The code length is shortened by fixing the code format 212, the multiplex correction 213, and the redundancy 216 (number of check bits).

The parent code includes an RS-8 (255, 239) code for unshortened 8-byte correction. The child codes include an RS-8 (205, 189) code equivalent to the code length shortened by 50 bytes, an RS-8 (155, 139) code equivalent to the code length shortened by 100 bytes, and so on. The child codes use the 16-byte fixed-length redundancy.

The code format 212 and the multiplex correction 213 are common to each other because the code format 212 uses Reed-Solomon and the multiplex correction 213 uses eight bytes. The same circuit can be used for processing when a sufficient communication interval between two different ONTs 2 reduces an effect of dynamically changing the code length. This can miniaturize the terminal.

On the other hand, the technology disclosed in Japanese Patent Laid-Open 2008-060820 or 2008-148245 can use the same circuit for processing when a sufficient communication interval is unavailable between two different ONTs 2 and an effect of dynamically changing the code length is considerable. Either technology can miniaturize the terminal.

The FEC redundancy is fixed to 16 bytes. It is possible to simplify band calculation performed by the OLT 1 and improve a band allocation speed.

The use of the shortened code can minimize the notification of available FEC codes between the OLT 1 and the ONT 2 and simplify control over the optical access system. This is because a shortened code can be decoded only when the code length is known. Each ONT 2 does not need to be notified of an FEC code (actually a code length) when the FEC code is encoded and decoded in accordance with a rule of unique correspondence between the transmission (reception) data length and the code length. The code format 212, the multiplex correction 213, and the redundancy 216 just need to be predetermined in the system. Alternatively, this information needs to be notified to the ONT 2 only when it starts.

Figure 9:
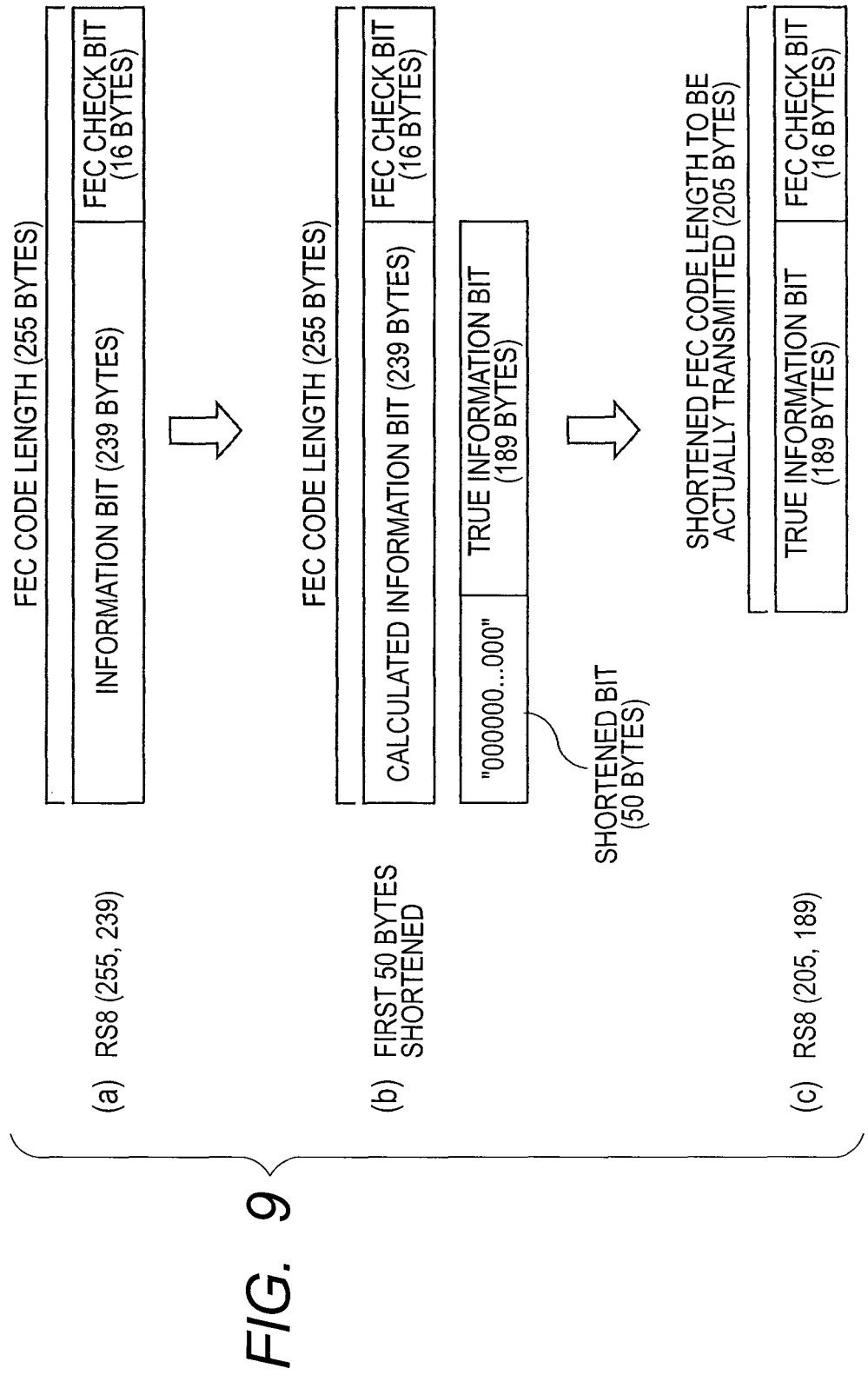
FIG. 9 illustrates how the FEC code length is decreased.

With reference to FIG. 9, relation between the parent code and the child code will be described. FIG. 9(a) shows the parent code RS-8 (255, 239). FIG. 9(c) shows the child code RS-8 (205, 189) shortened 50 bytes.

FIG. 9(b) shows a constant value (assumed to be zero) corresponding to first 50 bytes from the beginning of the parent code RS-8 (255, 239). Data is mapped to remaining 189 bytes. The terminal performs FEC encode calculation on 239 bytes (189+50) and appends the 16-byte FEC check bit. Actually, the terminal transmits 205 bytes except 50 bytes as the constant value. The 205 bytes are equivalent to the RS-8 (205, 189) code. When the code is received, it is FEC-decoded as 239 bytes with the constant prefixed at the beginning. No error occurs in the shortened bits that are not transmitted. The ratio of the FEC check bit to true information bits increases. That is, increasing the ratio of the FEC check bit improves the error correction. In other words, increasing the number of shortened bits improves the error correction.

The system may shorten 50 bytes between the true information bit and the FEC check bit instead of 50 bytes from the beginning. It just needs to ensure a correspondence between the position and the value that are omitted in the encode and decode calculation.

An effect of shortening the code length will be described with reference to FIG. 10. In FIG. 10, a comparison table 60 includes an FEC code 601, BER (Bit Error Rate) improvement 602, and a circuit scale (relative value) 603. The comparison table 60 compares FEC codes RS-8 (255, 239), RS-16 (255, 223), RS-8 (127, 111), and RS-8 (40, 24). The BER improvement 602 contains an arrow. A BER before the FEC correction precedes the arrow. A BER after the FEC correction succeeds the arrow.

In FIG. 10, the FEC code RS-8 (255, 239) is ineffective when the communication quality (BER) is degraded such as 0.007 that is equivalent to error occurrence on seven bits out of 1000 bits on average. The FEC code RS-16 (255, 223) doubles the error correction effect. The FEC code RS-8 (127, 111) provides the same effect while shortening 128 bytes and decreasing the circuit scale by half. The FEC code RS-8 (40, 24) provides 3-digit error correction. The circuit scale 603 is denoted as "unchanged" for RS-8 (127, 111) and RS-8 (40, 24). This signifies that the circuit scale is same as that for RS-8 (255, 239).

Generally, a code is selected before the system starts to operate. The code may be changed as needed during the system operation. The FEC code table in FIG. 8 provides FEC code candidates. Decreasing the code length increases the error correction improvement. While FIG. 8 provides five codes, the codes may be more finely tuned such as shortening in units of ten bytes. The code length may also be shortened by enhancing the multiplex correction to 16.

With reference to FIGS. 11A and 11B, the following describes the other FEC code tables based on distances between terminals or communication quality. FIG. 11A shows an FEC code table 21A for the OLT 1. The FEC code table 21A stores codes in relation to distances between the ONT 2 and the OLT 1. The FEC code table 21A is equivalent to the FEC code table 21 in FIG. 8 with the addition of a column of distance 217 between ONT and OLT.

A code corresponding to the distance between the ONT 2 and the OLT 1 is specified for installation of the ONT 2 and the OLT 1 before system operations, for firmware download, or for a startup process of the ONT 2. As mentioned above, increasing the communication distance degrades the communication quality (BER). As a countermeasure against this problem, the correspondence between a distance and a code is predetermined so that the FEC error correction can ensure a given level of BER or higher. FIG. 11A assumes the BER to be 10 to the minus eighth power. This is equivalent to a 1-bit error out of 10 to the eighth-power bits on average. The FEC code to be used is: RS-8 (255, 239) for transmission over a distance up to 20 km; RS-8 (205, 189) for transmission over a distance shorter than or equal to 21 km; RS-8 (155, 139) for transmission over a distance shorter than or equal to 22 km; RS-8 (105, 89) for transmission over a distance shorter than or equal to 24 km; or RS-8 (55, 39) for transmission over a distance shorter than or equal to 30 km. The longer distance requires the shorter code length. The PON system disallows a distance longer than 30 km. Changing the code RS-8 (255, 239) to the code RS-8 (205, 189) increases the code gain by 0.1 dB. It is assumed that transmission over an optical fiber line degrades the signal-to-noise ratio by 0.1 dB/km. That increased gain is used for canceling the degraded signal-to-noise ratio so as to maintain the BER of 10 to the minus eighth power. This makes it possible to extend the transmission distance by 1 km.

The PON system can autonomously measure a distance between the ONT 2 and the OLT 1. Using the above-mentioned ranging process, the ranging control section 28 of the OLT 1 can accurately calculate the distance between the ONT 2 and the OLT 1. The result is used to select FEC codes for the FEC decoder 13 and the FEC encoder 17 of the OLT 1. The OLT 1 configures the upstream FEC information to be inserted into a downstream PON frame.

FIG. 11B shows an FEC code table 21B for the OLT 1. The FEC code table 21B stores codes in relation to a raw BER between the ONT 2 and the OLT 1. The FEC code table 21B is equivalent to the FEC code table 21 in FIG. 8 with the addition of a column of BER 218 between ONT and OLT.

In FIG. 11B, the FEC code table 21B is additionally provided with a condition for satisfying the BER of 10 to the minus eighth power. The OLT 1 measures the raw BER between the ONT 2 and the OLT 1 and settles the corresponding code. Also in this case, the system is configured so that the more degraded raw BER uses the shorter code length. The PON system disallows degraded communication quality of 4×10 to the minus third power or more. This is because such degraded communication quality prevents the BER of 10 to the minus eighth power from being achieved even though the above-mentioned FEC codes are used. An exception is to replace the OLT 1 and the ONT 2 with equivalents that provide higher transmission and reception capabilities.

The receiving terminal can immediately calculate the BER between the OLT 1 and ONT 2 using the parity bit supplied to the PON frame and the CRC bit that is multiplexed with the PON frame and is supplied to the Ethernet frame. The ONT 2 just needs to calculate a downstream signal error rate and notify it to the OLT 1. The OLT 1 may calculate a downstream signal error rate based on a far-end code violation value (REI) that is supplied to an upstream signal from the ONT 2 to the OLT 1 and is detected at the ONT 2. The OLT 1 calculates an upstream signal error rate. To acquire a raw BER, the OLT 1 measures the BER without performing the FEC decode. To acquire a BER after the FEC decode, the OLT 1 performs the FEC decode and then measures the BER.

The BER can also be estimated in accordance with the number of bits corrected by the FEC decode or the number of uncorrected events. Totaling both counts yields the raw BER. Counting the number of uncorrected events yields the BER after the FEC decode.

According to FIGS. 11A and 11B, it is possible to easily ensure given communication quality and simplify the band allocation calculation irrespectively of the distance between the ONT 2 and the OLT 1 or the original communication quality.

Figure 12:
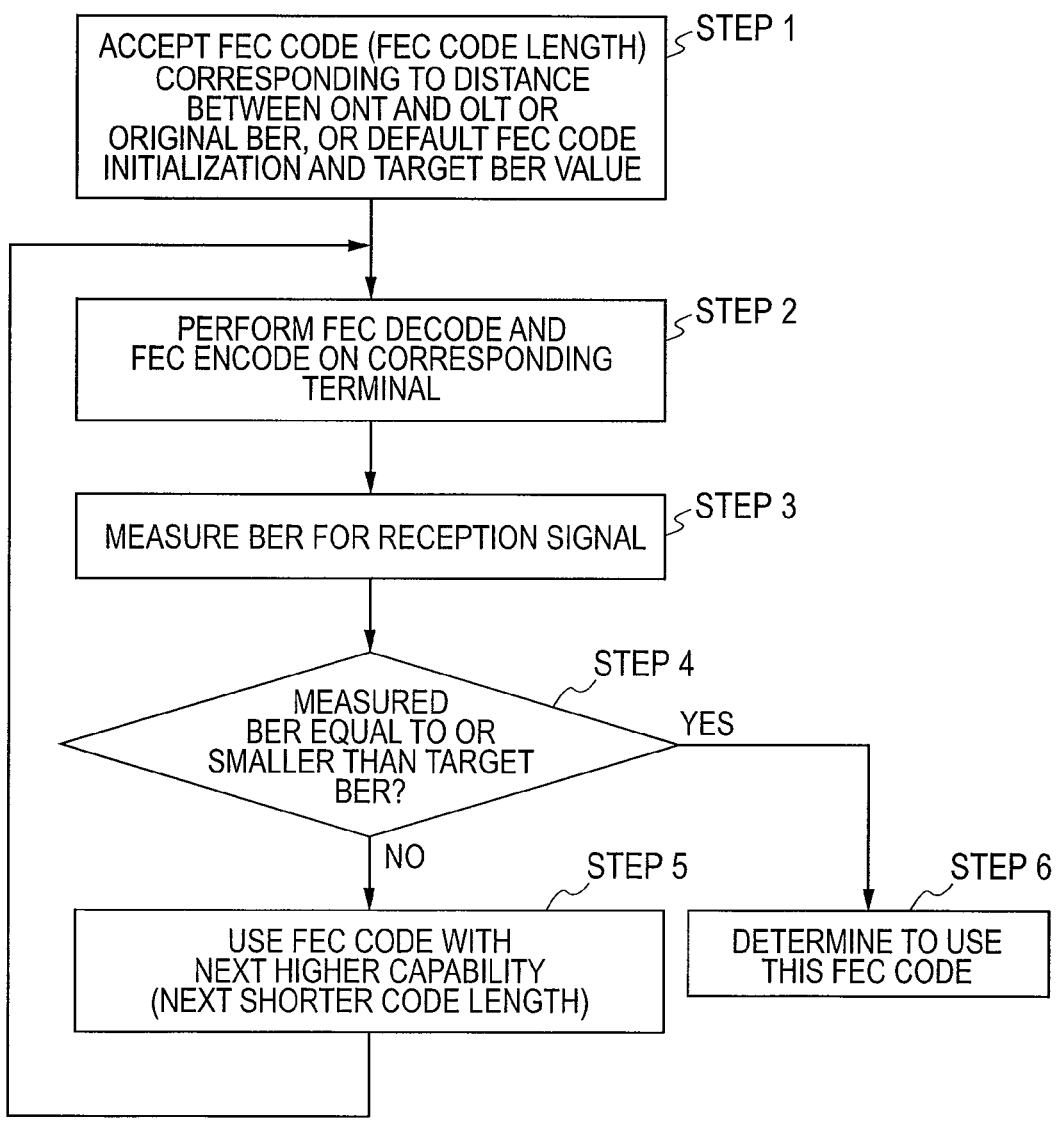
FIG. 12 is a flowchart showing an FEC code length selection process.

With reference to FIG. 12, the following describes a process of measuring the BER after the FEC decode and automatically determining the FEC code. The process in FIG. 12 is performed in the middle of or after a startup process for the ONT 2. The process measures a BER after the FEC error correction after initialization of codes for the ONT 2 and the OLT 1. When the BER does not satisfy a target value, the process changes the BER to the next shorter code length and repeats these steps until the target value is reached.

In FIG. 12, the ONT 2 or the OLT 1 accepts the setting of an FEC code in accordance with the distance between the ONT 2 and the OLT 1 or the raw BER or the setting of a default FEC code and the setting of a BER target value (Step 1). The ONT 2 or the OLT 1 performs the FEC decode and the corresponding terminal performs the FEC encode (Step 2). The ONT 2 or the OLT 1 measures the BER for the received signal (Step 3). The ONT 2 or the OLT 1 determines whether or not the measured BER is smaller than or equal to the target BER (Step 4). When the determination at Step 4 results in YES, the ONT 2 or the OLT 1 determines to use the FEC code (Step 6) and terminates the process. When the determination at Step 4 results in NO, the ONT 2 or the OLT 1 changes the FEC code to another with the next higher capability (Step 5) and returns to Step 2.

In FIG. 12, the code initialization conforms to the distance between the ONT 2 and the OLT 1 or to the raw BER or is unexceptionally configured as a default across the PON system. The BER target value demands stringent quality requirements of 10 to the minus 12th power with respect to a random error or intrinsically less critical errors occurring on a communication path (optical fiber) and in the receiving terminal. By contrast, the communication quality is reduced to 10 to the minus eighth power with respect to a burst error or intrinsically critical errors. The communication quality needs to be configured just enough to minimize a communication interrupt. In either case, the communication quality may be predetermined as the PON system or may be variable depending on throughput of each ONT 2.

As mentioned so far, FEC codes can be automatically, easily, and appropriately changed in accordance with a distance between the ONT 2 and the OLT 1, reception and transmission throughput of each ONT 2, or situations of errors actually occurring on the communication path. There may be a case where the BER suddenly degrades during operation due to an environmental change. In such case, the selected FEC code may be insufficient and the communication may be interrupted. To solve this problem, the process at Step 3 and later (including a loop from Step 5 to Step 2) is periodically performed even during the operation. Consequently, the FEC code can be easily and appropriately changed.

Figure 13:
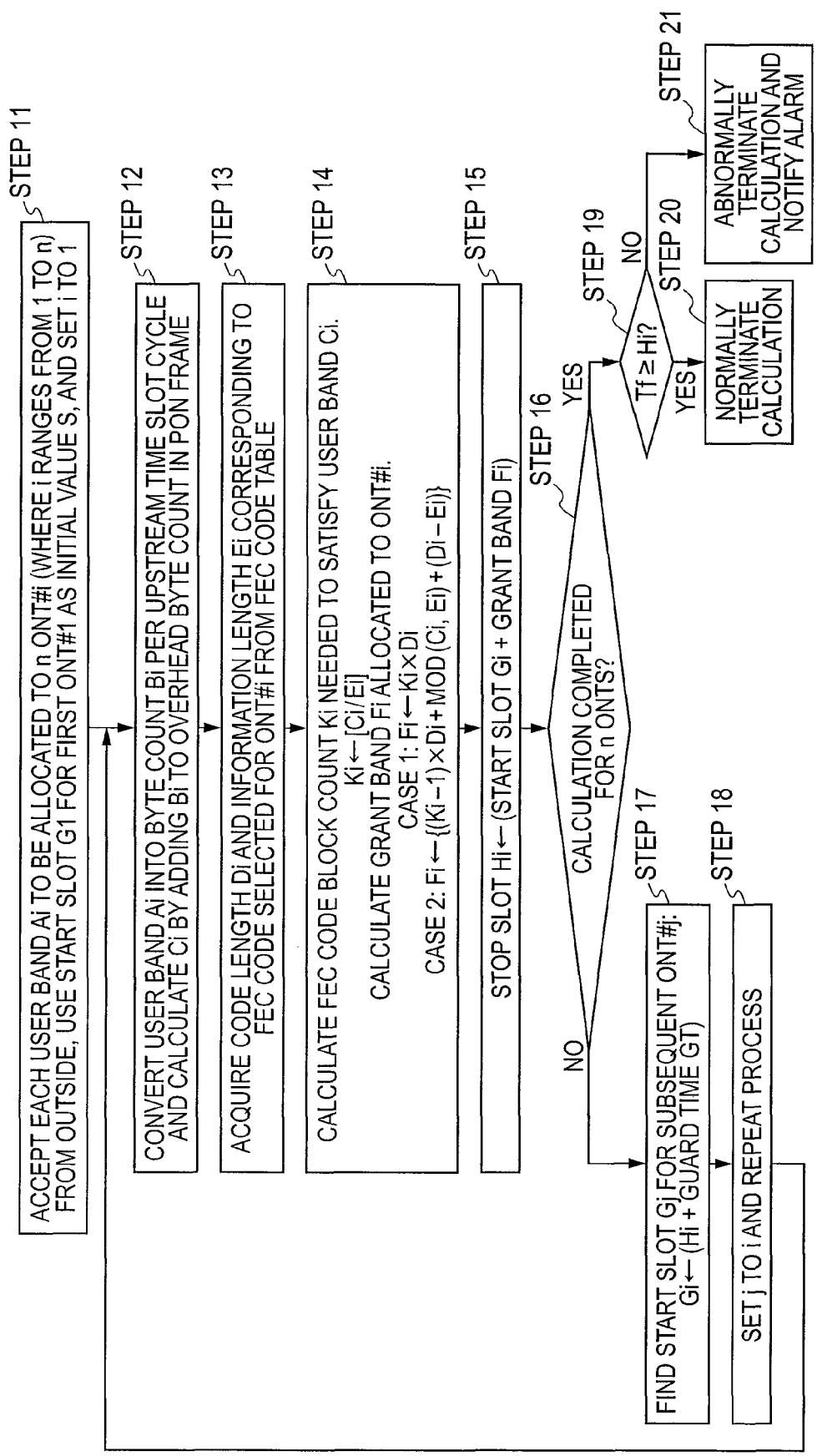
FIG. 13 is a flowchart showing a band calculation process.

With reference to FIG. 13, the following describes a calculation process of the band calculation section in the OLT in consideration for the FEC code redundancy. In FIG. 13, [a]

denotes an integer resulting from rounding the decimal part of value a to the nearest integer above. MOD(a, b) denotes a remainder of "a" based on modulus b. Tf denotes the number of bytes equivalent to a time slot cycle.

In FIG. 13, the OLT 1 accepts an ONT 2 number indicating the targeted ONT 2 and user band Ai allocated to that ONT 2 as many as all ONTs 2 (count n) from an external control system via the control interface 52. An upstream time slot is provided with initial value S (predetermined value) indicating a transmission start position (start slot) for ONT 2#1 (not limited to the ONT-1) to which the transmission is allocated first. A user band is allocated in predetermined units of bit rates such as 10 Mbits/s or the number of bytes per upstream time slot such as 1000 bytes. The user band excludes the redundancy of the FEC. The process sets i to 1 (Step 11).

The upstream time slot cycle will be described in detail. The upstream time slot contains a predetermined cycle (125 μs according to the G-PON system). Within the cycle, transmission from the ONT 2 occurs only once in response to one piece of grant information. When a new time slot cycle starts, the ONT 2 restarts the transmission at the same timing. Normally, the OLT 1 cyclically issues grant information (e.g., at the grant cycle of one millisecond). When the grant information varies at this cycle, the transmission starts at a new timing from the subsequent time slot cycle. Let us assume the upstream time slot cycle to be 125 μs and the grant cycle to be one millisecond. Then, the ONT 2 performs transmission eight times in one millisecond until the next grant information is received.

When the same grant information is issued at the next grant cycle, the ONT 2 continues the transmission eight times in one millisecond at the same timing. When the grant information received so far is not issued, the ONT 2 subsequently disables the transmission at the timing so far, awaits newly issued grant information, and performs the transmission eight times in one millisecond at the specified timing. When the PON system does not use a specified upstream time slot cycle, the grant cycle is also assumed to be an upstream time slot cycle.

The OLT 1 converts user band Ai specified as a bit rate into byte count Bi per upstream time slot cycle. Let us assume the user band to be 10 Mbits/s and the upstream time slot cycle to be 125 μs. The ONT 2 then converts the user band into 157 bytes (by rounding up the decimal part). When the user band is specified as the number of bytes per grant cycle at Step 11, the OLT 1 directly assumes Ai to be Bi. The ONT 2 finds user band Ci by adding Bi and the number of bytes for the overhead in the upstream PON frame (Step 12).

The OLT 1 acquires parameters (code length, information length, and redundancy) corresponding to the FEC code selected by the ONT 2 from the FEC code table (Step 13).

The OLT 1 calculates a band from the number of code blocks needed for user band Ci in addition to the FEC redundancy (check bit). Case 1 shows the calculation using only the code having code length Di. The OLT 1 provides FEC code blocks as many as value Ki (decimal part rounded up) that results from dividing the user band by information length Ei. Consequently, the band is provided so that ONT 2#i is assigned the product of code length Di and Ki.

Case 2 shows the calculation that shortens the last FEC for economical use of resources. The calculation uses FEC code blocks as many as (Ki-1) having code length Di and one FEC code block whose information length is equivalent to the remainder (MOD(Ci, Ei)). The last term (Di-Ei) corresponds to the FEC code redundancy and equals the redundancy acquired at Step 13. Consequently, the band is provided so that ONT 2#i is assigned the product of code length Di and (Ki-1) plus the length (MOD(Ci, Ei)+(Di-Ei)) of the one remaining FEC code block (Step 14).

Let us assume user band Bi to be 1250 bytes, the upstream PON frame overhead to be 20 bytes, the FEC code length to be 255 bytes, and the information length to be 223 bytes. Then, Ki is 6, and the ONT 2 is assigned a 1530-byte band in case 1 and a 1462-byte band in case 2.

The OLT 1 converts the band assigned to the ONT 2 into an equivalent stop slot. The ONT 2 starts transmission at a start slot and terminates transmission at the stop slot. This means that the ONT 2 transmits data equivalent to band Fi assigned to the ONT 2 (Step 15).

The OLT 1 determines whether or not the calculation for all the ONTs 2 is completed (Step 16). When the calculation is not completed (NO), the OLT 1 assumes that the next ONT 2#j starts transmission from a start slot subsequent to a guard time (predetermined value) provided after the stop slot calculated at Step 15 (Step 17). The OLT 1 sets j to i (Step 18). The OLT 1 returns to Step 12 and repeats the subsequent process to calculate bands sequentially assigned to the next ONT 2#2 through ONT 2#n. Variable i is not incremented but is assigned j because time slots are not always assigned in numerical order.

When the calculation is completed for all the ONTs 2 at Step 16 (YES), the OLT 1 determines whether or not stop position Hi for the last ONT 2 belongs to a normal range that does not exceed the upstream time slot cycle (Step 19). When the determination at Step 19 results in YES, the OLT 1 terminates a series of calculation. When an error is found at Step 19 (NO), the ONT 2 assumes large user band Bi exceeding the upstream time slot cycle to be assigned from outside, notifies an alarm to the external control system (Step 21), and terminates the calculation.

When the process terminates abnormally, the external control system, notified of the alarm, appropriately decreases user band Bi assigned to the ONT 2 so as not to exceed the upstream time slot cycle. The OLT 1 repeats the process from Step 11 until it terminates normally.

The addition at Step 12 by the OLT 1 is unnecessary when no FEC code is calculated for the overhead of the PON frame, that is, no error correction is applied to the overhead. In this case, the OLT 1 directly uses user band Bi as user band Ci. The OLT 1 finally adds at Step 14 the number of bytes for the overhead to grant band Fi.

As described with reference to FIG. 3, the grant generation section 26 converts the number of bytes for issuing the grant calculated by the band calculation section 27 into the grant information (start slot and stop slot). In consideration for the FEC redundancy, the grant generation section 26 directly uses results (start slot and stop slot) at Steps 15 and 17 in the band calculation section 27.

Figure 16:
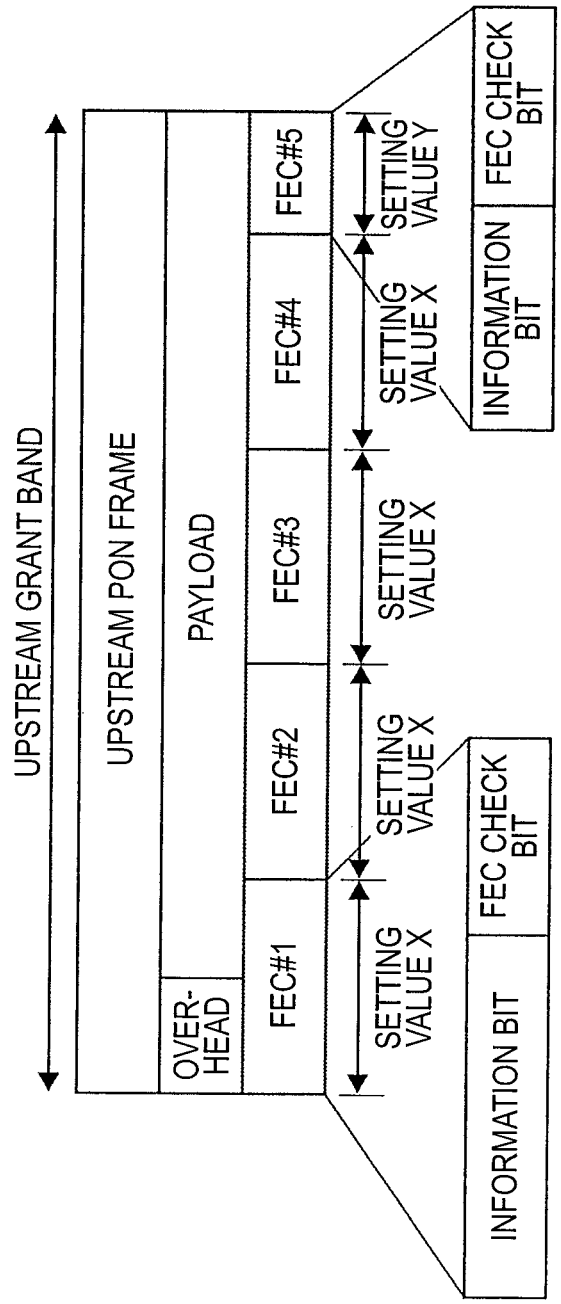
FIG. 16 illustrates the configuration of FEC codes for an upstream PON frame.

When the above-mentioned band calculation terminates normally, the OLT 1 transmits the grant information reflecting the calculation result to ONT 2. When accepting the grant information, the ONT 2 transmits an upstream PON frame as shown in FIG. 16 to be described later in detail. In case 1 at Step 14, the ONT 2 transmits a PON frame containing six FEC code blocks where an upstream grant band uses 1530 bytes and values X and Y each use 255 bytes in FIG. 16. In case 2, the PON frame contains the 1462-byte upstream grant band where five FEC blocks each use the 255-byte X value and one FEC block uses the 187-byte Y value.

In FIG. 13, FEC codes may vary with ONTs 2 in a real-time manner. At Step 13, the band calculation section 27 acquires the corresponding parameters (code length, information length, and redundancy) from the FEC code table each time the FEC code varies. At Step 14 and later, the band calculation section 27 performs the real-time band calculation in accordance with the parameters. Even though the FEC codes may vary with ONTs 2 in a real-time manner, the OLT 1 can easily implement the band calculation in consideration for the FEC code redundancy using the common algorithm and improve the band calculation speed.

Figure 14:
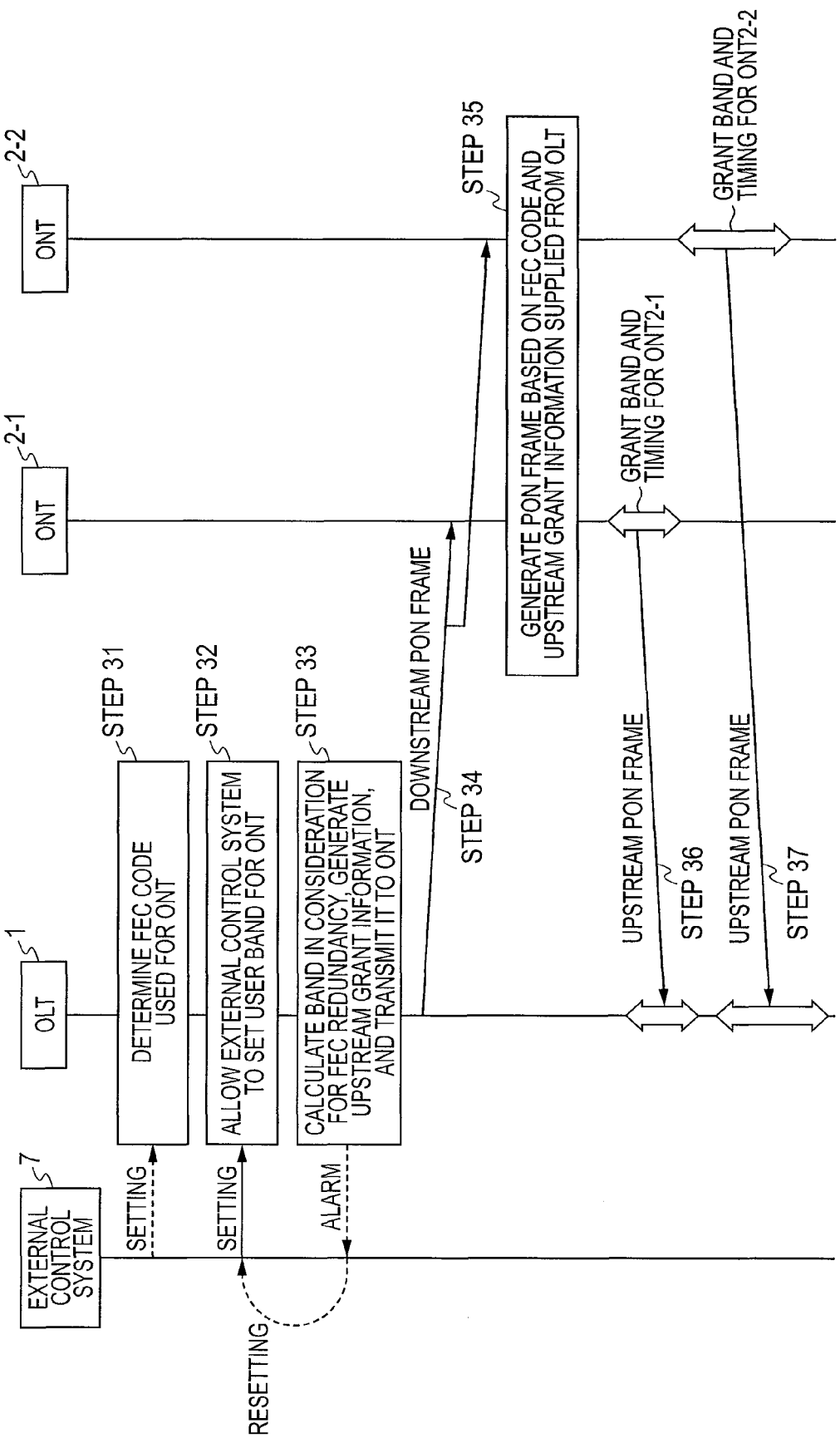
FIG. 14 is a sequence diagram showing grant issuance and upstream transmission.

With reference to FIG. 14, the following describes a process including transmission of grant information from OLT to ONT and, as a response, transmission of an upstream PON frame from the ONT 2. In FIG. 14, the FEC code table 21 for the OLT 1 and the FEC code table 41 for the ONTs 2-1 and 2-2 store parameters for multiple FEC codes in advance.

The OLT 1 determines an FEC code used for each ONT 2 based on settings of an external control system 7 (Step 31). The OLT 1 may automatically determine an FEC code as shown in FIG. 12. The FEC code is assigned to the grant generation section 26 and is reserved for the FEC decoder 13 to receive upstream signals in the OLT 1. The FEC code to be determined is stored in the FEC code table 21.

According to settings of the external control system 7, the OLT 1 assigns a user band supplied for each ONT 2 to the upstream grant information generation section 26 in the OLT 1 (Step 32). Generally, the user band is configured at a bit rate such as kilobits per second and is chiefly settled for the service contract with a user who uses the ONT 2.

The band calculation section 27 in the OLT 1 performs band calculation in consideration for the FEC redundancy. The upstream grant information generation section 26 generates upstream grant information (Step 33). The band calculation at Step 33 is already described with reference to FIG. 13. The upstream grant information generation will be described later in detail with reference to FIG. 17. Storage of the grant information in the overhead of the downstream PON frame will be also described later in detail with reference to FIG. 17.

When an alarm occurs at Step 33, the external control system 7 readjusts the user band to be assigned to the ONT 2 and repeats Steps 32 and 33. The alarm is already described with reference to FIG. 13.

The OLT 1 stores the grant information in the overhead of the downstream PON frame and transmits it to the ONTs 2-1 and 2-2 (Step 34). The downstream PON frame transmitted from the OLT 1 is split in the optical splitter 3 and reaches the ONTs 2-1 and 2-2.

Each ONT 2 analyzes the upstream grant information transmitted to itself. The ONT 2 encodes the grant information using an FEC code assigned to the ONT 2 (Step 35). Based on the transmission timing, each ONT 2 independently transmits the upstream PON frame to the OLT 1 (Steps 36 and 37). The optical splitter 3 multiplexes the PON frames independently transmitted from the ONTs 2-1 and 2-2. The OLT 1 then receives the multiplexed upstream PON frame. The multiplexing causes no collision because the OLT 1 manages the upstream time slot and generates upstream grant information so as to prevent upstream PON frames transmitted from the ONTs 2-1 and 2-2 from colliding with each other in the managed time slot. The upstream grant information and the transmission timing will be described later in detail with reference to FIG. 17. The ONT 2 determines an FEC code used for upstream communication in accordance with the upstream FEC information 118 in the overhead of the downstream PON frame in FIG. 5. The FEC encoder 37 acquires parameters stored in the FEC code table 41 and chooses from the encoders 44-1 through 44-k in the FEC encoder 37.

When receiving the upstream PON frame from the ONT 2, the OLT 1 performs decode calculation corresponding to the FEC code used for each ONT 2 and restores the targeted upstream signal. The OLT 1 uses the FEC code reserved at Step 31 or determines an FEC code in accordance with the upstream FEC identification code (FIG. 6) in the overhead of the received upstream PON frame. The OLT 1 acquires parameters stored in the FEC code table 21 and chooses from the decoders 22-1 through 22-m in the FEC decoder 13.

Figure 15:
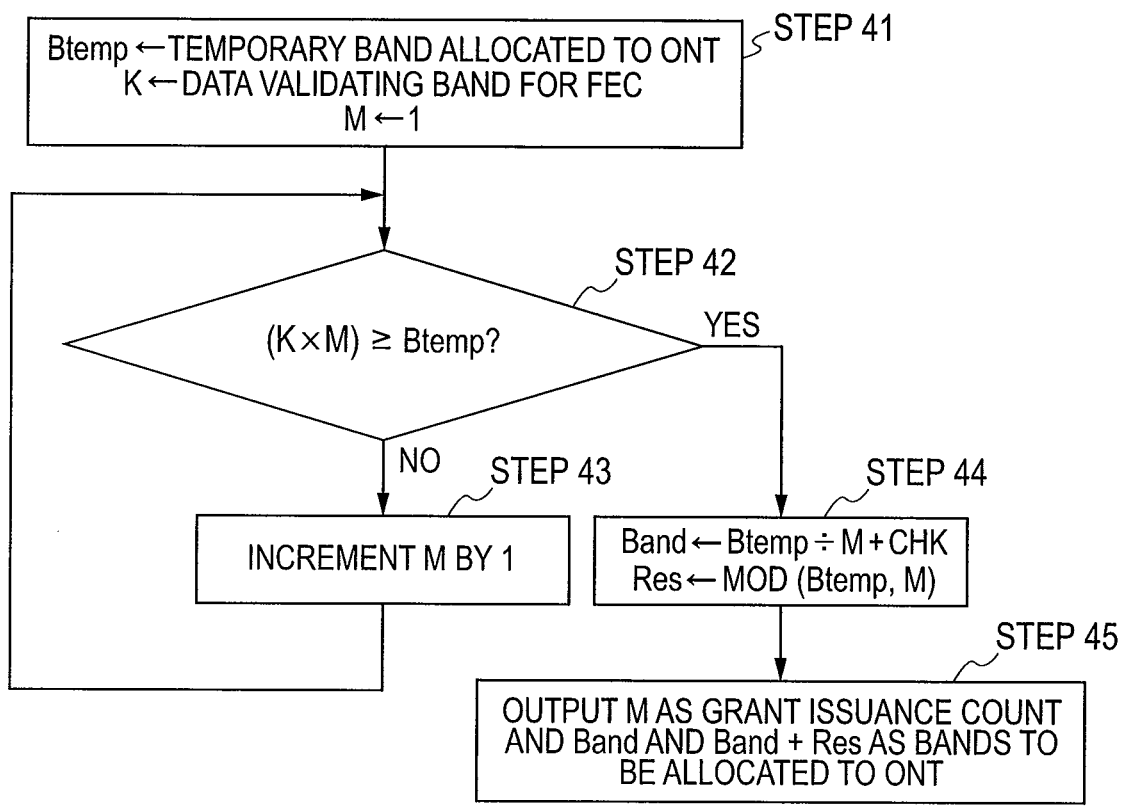
FIG. 15 is a flowchart showing a band calculation process.

With reference to FIG. 15, the following describes a process of the band calculation section in the OLT so as to correct a decrease in the data validating band when a shortened code is used. In FIG. 15, the band calculation section 27 substitutes a temporary band assigned to the ONT 2 into Btemp, the data validating band for the FEC code into K, and 1 into M (Step 41). The band calculation section 27 determines whether or not K×M is greater than or equal to Btemp (Step 42). When the determination at Step 42 results in NO, the band calculation section 27 increments M (Step 43) and returns to Step 42. When the determination at Step 42 results in YES, the band calculation section 27 substitutes Btemp÷M+CHK into Band and MOD(Btemp, M) into Res (Step 44). In this example, CHK denotes the FEC check bit length that is uniquely found when the FEC code is selected. MOD(Btemp, M) denotes a remainder of Btemp divided by M. The band calculation section 27 assumes M to be the grant issuance count, and Band and Band+Res to be the start position and the stop position of a band provided for the time slot to be assigned to the ONT 2 (Step 45) and then terminates the process. All the M grant bands may be used as (Band+Res). For economical use of resources, however, (M−1) bands are used as Band and only one remaining band is used as (Band+Res) to cancel a remainder resulting from the division into M equal parts. Any of M grants may be used to cancel the remainder.

When shortened codes are associated with a common parent code, shortening the FEC code length also decreases the information length of the FEC code. Let us suppose that the code RS (255, 239) is shortened 128 bytes into the code RS-8 (127, 111). The information length also decreases by 128 bytes from 239 bytes to 111 bytes. At least three FEC codes are needed to transmit 239 bytes of user data.

When the upstream grant band is assigned, the 255-byte band is reduced to the 127-byte band in order to actually shorten the code length. The band is reduced so that one burst signal (successively transmitted from the same ONT 2 by one-time operation) corresponds to one FEC code. Further, the ONT 2 is forced to transmit three burst signals, i.e., three times the data validating band (111 bytes) for the shortened code in order to ensure the data validating band (239 bytes) for the original code.

The decrease in the data validating band can be corrected by increasing the grant issuance count to three in the grant information supplied to the ONT 2 from OLT 1. The number of burst signals is increased to three so that the ONT 2 can transmit these burst signals.

The band calculation section 27 calculates the grant issuance count M and M bands (number of bytes). The grant generation section 26 generates related grant information. The number of grants issued per grant issuance interval increases to M, making it possible to ensure an actually required effective band. For example, let us suppose that the code RS (255, 239) is changed to the code RS (127, 111) while the ONT 2 is assigned a 239-byte user band unchanged. The necessary user band can be ensured by increasing the grant issuance count from one to three.

With reference to FIG. 16, the following describes an upstream PON frame for improving a decrease in the data validating band. In FIG. 16, the upstream PON frame includes an overhead and a payload. According to the example, one grant is divided into areas each corresponding to the FEC code length instead of dividing the user band assigned to the ONT 2 into multiple grants to be issued. When the upstream grant band assigned to the ONT 2 is longer than the FEC code length, the grant band is sequentially divided by the FEC code having the intended code length. The last remainder is used as an FEC code having the same length as the remainder.

For example, let us suppose that intended code lengths use 255 bytes, 120 bytes, and 60 bytes, and the upstream grant information band uses 180 bytes. A 180-byte PON frame may be divided into one 120-byte FEC code and one 60-byte FEC code or may be divided into three 60-byte FEC codes. The OLT 1 specifies which method to use as various types of overhead information in the upstream grant information. The method is predetermined according to preference for shorter codes, for example. In this case, the intended FEC code length needs to be an aliquot part of the upstream grant information band.

Let us suppose that all intended FEC code lengths are 255 bytes or shorter and are longer than or equal to the FEC check bit. In this case, the upstream PON frame is assumed to be as long as the upstream grant information band and is divided by an X-byte code. The last remaining code is assumed to be Y-byte long. The OLT 1 specifies values X and Y as various types of overhead information in the upstream grant information. Alternatively, the values may be fixed to 60 bytes in advance, for example. As an example, the upstream PON frame is divided into one 180-byte FEC code when X is assumed to be 255 and the band is assumed to be 180 bytes. As another example, the upstream PON frame is divided into two 127-byte FEC codes and one 46-byte FEC code when X is assumed to be 127 and the band is assumed to be 300 bytes.

The number of grants assigned to the ONT 2 may be adjusted so as to correct a decrease in the information length when the external control system shortens the FEC code length. The method in FIG. 15 may be used to provide multiple grants to be transmitted to the same ONT 2. This increases the number of grants issued per grant issuance interval.

Figure 17:
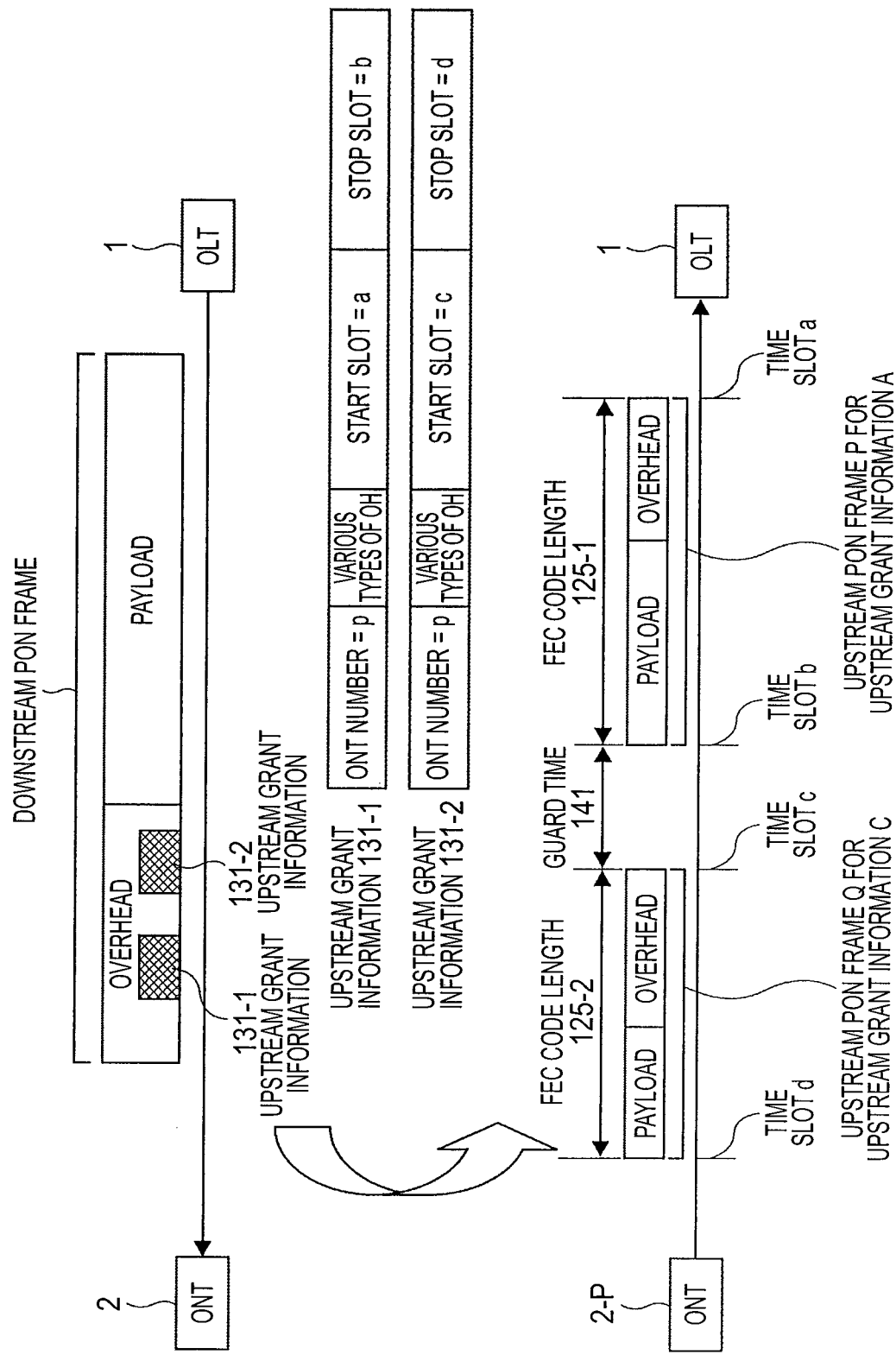
FIG. 17 illustrates grant issuance from OLT and upstream PON frames from ONT.

With reference to FIG. 17, the following describes a process of issuing grants using a downstream PON frame and transmitting an upstream PON frame from the ONT that receives the downstream PON frame. In FIG. 17, the OLT 1 issues two pieces of upstream grant information 131-1 and 131-2 to the overhead of the downstream PON frame.

The upstream grant information 131-1 notifies ONT 2-p with ONT number p of a band from start slot a to stop slot b. The upstream grant information 131-2 notifies ONT 2-p with ONT number p of a band from start slot c to stop slot d.

The ONT 2-p with ONT number p successively transmits two upstream PON frames P and Q by sandwiching a guard time 141 therebetween. Based on the upstream grant information 131-1, the upstream PON frame P starts the transmission at the timing of the upstream time slot "a" and terminates the transmission at the timing of the upstream time slot "b." Accordingly, the band is equivalent to a difference between "b" and "a." Based on the upstream grant information 131-2, the next upstream PON frame Q starts the transmission at the timing of the upstream time slot "c" and terminates the transmission at the timing of the upstream time slot "d." Accordingly, the band is equivalent to a difference between "d" and "c." FIG. 17 shows that the respective bands use vary dynamically varying FEC code lengths 125-1 and 125-2.

According to the example, the upstream grant information is supplied with an ONT number. In addition, the ALLOC-ID described in FIG. 6 may be supplied instead. The ALLOC-ID is associated with the specific ONT 2. The ONT 2 recognizes the ALLOC-ID transmitted to itself and transmits the GEM associated with the ALLOC-ID.

One-to-one correspondence may be maintained according to a given rule between the band (difference between the stop slot and the start slot) contained in the upstream grant information, the upstream PON frame length, and the FEC code length. These three do not need to use the same value. Specifically, the upstream grant information band excludes the necessarily supplied fixed length such as the guard time and the overhead between adjacent upstream PON frames. The receiving ONT 2 may transmit the upstream PON frame by adding the fixed length. The fixed length may be equivalent to the overhead or part thereof such as a portion containing a fixed pattern for frame synchronization. The fixed length may be excluded from the FEC code area. The FEC code length may be shortened by the fixed length from the upstream PON frame length.

Figure 18:
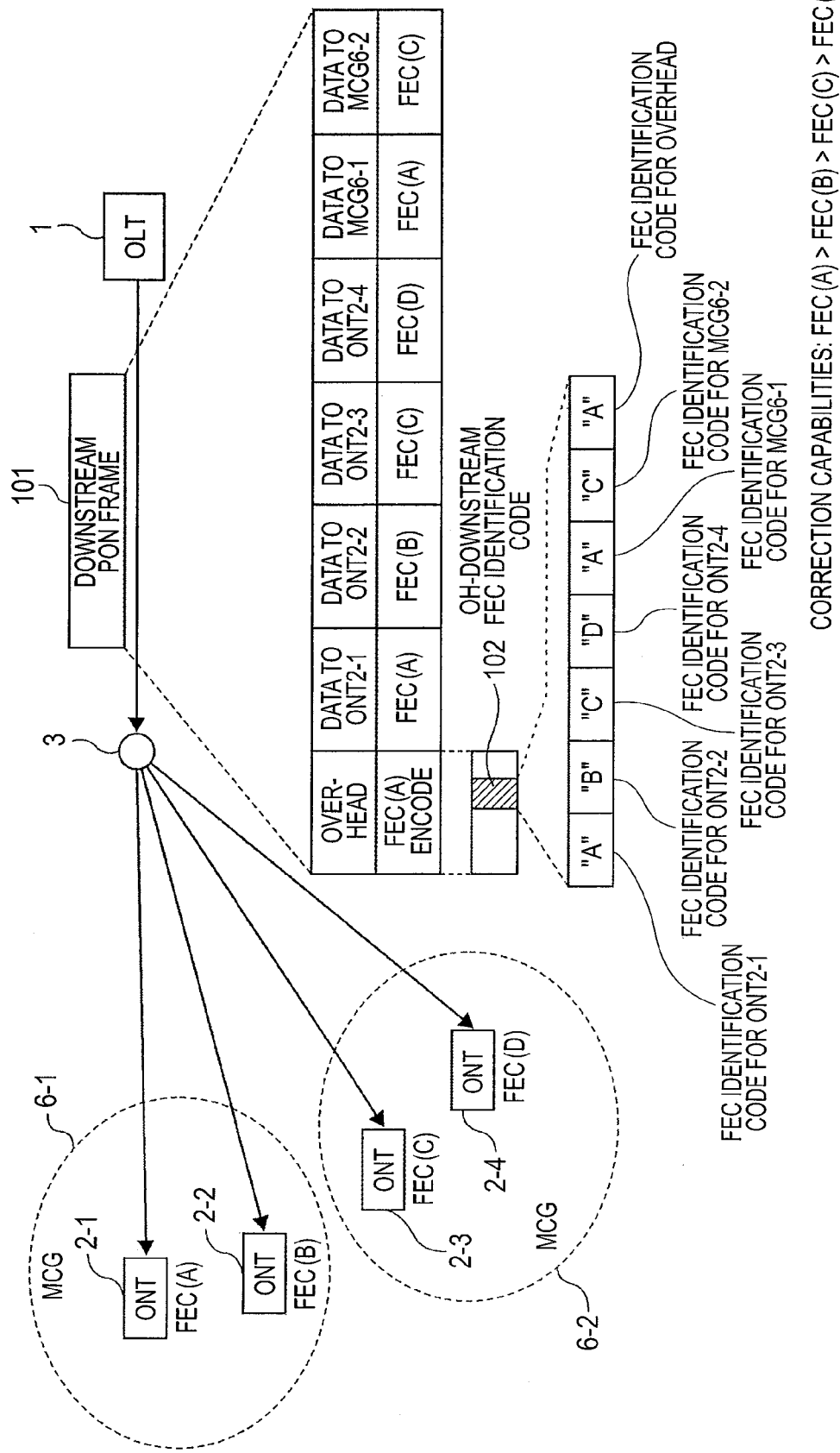
FIG. 18 illustrates how the optical access system selects FEC codes.

With reference to FIG. 18, the following describes downstream communication in the optical access network system. In FIG. 18, the OLT 1 uses FEC code (A) for unicast data transmitted to the ONT 2-1. Similarly, the OLT 1 uses FEC code (B) for unicast data transmitted to the ONT 2-2. The OLT 1 uses FEC code (C) for unicast data transmitted to the ONT 2-3. The OLT 1 uses FEC code (D) for unicast data transmitted to the ONT 2-4 for encoding.

The ONTs 2 receive the unicast data and use the respective FEC codes for decoding. Error correction capabilities are prioritized in the order of FEC code (A), FEC code (B), FEC code (C), and FEC code (D) from the highest to the lowest.

The OLT 1 uses FEC code (A) with the highest capability for the PON frame overhead. When receiving the PON frame, all the ONTs 2 use FEC code (A) for decoding. FEC code (A) is used because the use of the other codes cannot ensure sufficient communication quality on the ONT 2-1.

The OLT 1 encodes data transmitted to a multicast group 6-1 of the ONT 2-1 and the ONT 2-2 using FEC code (A) that has the highest capability in the FEC codes assigned to the ONTs 2 in the multicast group. The ONT 2-1 and the ONT 2-2 then use the corresponding FEC code (A) for decoding. FEC code (A) is used because the use of FEC code (B) cannot ensure sufficient communication quality on the ONT 2-1.

The OLT 1 encodes data transmitted to a multicast group 6-2 of the ONT 2-3 and the ONT 2-4 using FEC code (C) that has the highest capability in the FEC codes assigned to the ONTs 2 in the multicast group. The ONT 2-3 and the ONT 2-4 then use the corresponding FEC code (C) for decoding. FEC code (C) is used because the use of FEC code (D) cannot ensure sufficient communication quality on the ONT 2-3.

The OLT 1 inserts the identification code of the FEC code used for the data into the OH-downstream FEC identification code 102 in the overhead of the downstream PON frame 101 and notifies the frame to all the ONTs 2.

The OLT 1 can maintain high band usability for the PON while using FEC codes for unicast data transmitted to the ONTs 2 based on communication distances and communication quality. The OLT 1 can exchange multicast data and overheads with multiple ONTs 2 while ensuring the sufficient communication quality.

Figure 19:
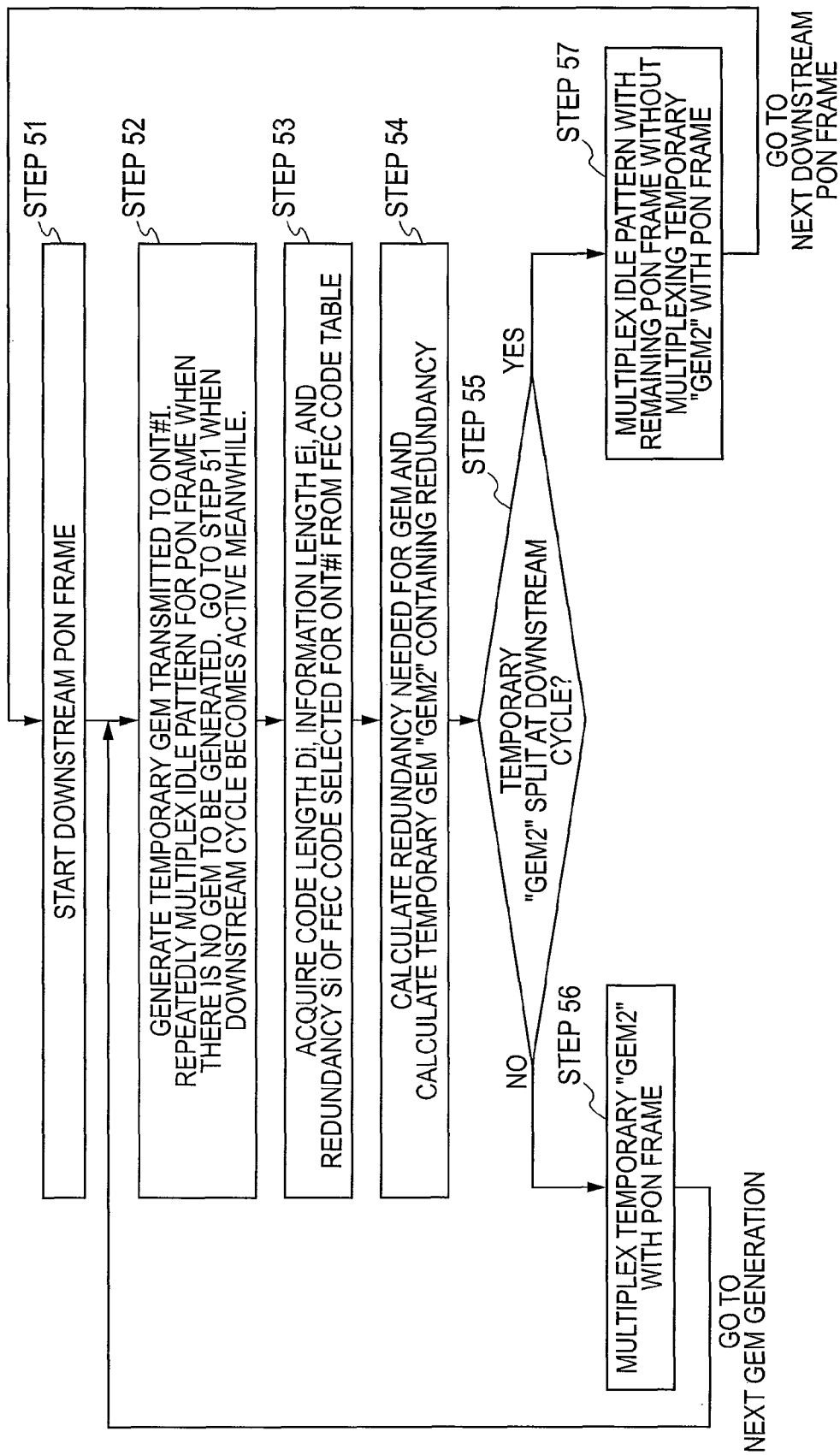
FIG. 19 is a flowchart showing downstream GEM frame generation.

With reference to FIG. 19, the following describes a process of generating a GEM frame in consideration for the FEC redundancy in the downstream communication. Let us suppose that G-PON multiplexes GEM with a downstream PON frame having the 125 µs cycle and an attempt is made to perform FEC encode for each GEM or add an FEC check bit area. In such case, the GEM may exceed the 125 µs cycle or extend to a different downstream PON frame. The process in FIG. 19 aims to avoid this problem.

The GEM generation section 19 of the OLT 1 starts a given downstream PON frame and generates and multiplexes GEM subsequently (Step 51). The GEM generation section 19 generates a temporary GEM not containing redundancy targeted for ONT 2#I (Step 52). The GEM generation section 19 acquires code length Di, information length Ei, and redundancy Si for the FEC code selected by ONT 2#i from the FEC code table 21 (Step 53).

The GEM generation section 19 calculates redundancy needed for the GEM and calculates the length of temporary GEM "GEM2" containing the redundancy (Step 54). The GEM generation section 19 determines whether or not the temporary "GEM2" is broken at the downstream cycle when GEM2 is multiplexed with the PON frame. When GEM2 is not broken at the downstream cycle, the GEM generation section 19 multiplexes the temporary "GEM2" with the PON frame (Step 56) and repeats the process from Step 52 and later to generate the next GEM.

When GEM2 is broken at the downstream cycle at Step 55, the GEM generation section 19 does not multiplexes the temporary "GEM2" with the PON frame and multiplexes an idle pattern with the remaining area in the PON frame until the downstream cycle occurs (Step 57). The GEM generation section 19 repeats the process at Step 51 and later so as to multiplex the temporary "GEM2" with the next downstream PON frame at the downstream cycle and later.

At Step 52, there may be no GEM to be generated. The condition is equivalent to no user signal from the external IP network, for example. In such case, the GEM generation section 19 repeatedly multiplexes the idle pattern with the PON frame. The GEM generation section 19 repeats this process until a condition to generate GEM takes effect. The condition is equivalent to arrival of a user signal from the external IP network, for example. When the condition to generate no GEM continues, the GEM generation section 19 multiplexes the idle pattern until the next downstream cycle, returns to Step 51, and starts the next PON frame.

As mentioned above, the GPON frame process can be simplified by reassigning the GEM to the downstream PON frame without allowing the GEM to exceed the 125 μs cycle like G-PON.

The above-mentioned embodiment provides: means for predetermining FEC code candidates selectable for ONTs and storing the redundancy and the code length of each FEC code in a table; means for selecting an FEC code to be used; means for using a selected FEC code for encoding or decoding; means for referencing the table during band assignment calculation and calculating a band in consideration for the FEC redundancy and the code length; and means for notifying the selected FEC to ONT or OLT as a destination.

Further, the embodiment provides means for allowing a table to store a shortened code having the common parent code and its shortened code length instead of the FEC code having high capability of code error correction, assigning a short band during calculation so as to configure a bust signal transmitted from the ONT using at most one FEC code, and calculating to ensure a specified communication band by increasing the number of burst signals transmitted from the ONT.

Moreover, the embodiment provides: means for storing FEC codes in a table in association with the communication distance and the original communication quality; and means for referencing the table and automatically selecting an FEC code.

Furthermore, the embodiment provides: means for selecting FEC codes for overhead and multicast used for multiple ONTs in addition to FEC codes for unicast independently selected for each ONT in terms of a downstream signal process; and means for notifying the selected FEC codes to the OLT and the ONT.

The embodiment can reduce hardware costs by decreasing the number of FEC code combinations for the PON that transmits signals at a high speed (1 Gbits/s or more) over a long transmission distance (0 to 20 km or longer). In addition, the embodiment can provide a highly reliable optical access system that prevents the band assignment response time from degrading in consideration for the FEC redundancy.

The embodiment can further reduce hardware costs by limiting a combination of FEC codes to shortened codes. The embodiment can provide a highly reliable optical access system that further prevents the band assignment response time from degrading in consideration for the FEC redundancy and eliminates the need for notifying individual ONTs 2 of FEC codes.

The embodiment can provide an optical access system that automatically and easily selects appropriate FEC codes in accordance with communication distances or the communication quality subject to real-time changes before and during operations.

The embodiment can provide an optical access system that can apply FEC to data such as a downstream overhead and a multicast signal transmitted to multiple ONTs 2.

What is claimed is:

1. An optical access system comprising an optical line terminal and a plurality of optical network terminals,
   wherein the optical line terminal and the optical network terminal each include an FEC code table for storing FEC code candidates to be used; and
   wherein the FEC code candidate stored in the FEC code table contains a parent code and a shortened code based on the parent code; and
   the optical line terminal includes a band calculation section that uses the FEC code table to calculate an area assigned to communication with the optical network terminal.

2. The optical access system according to claim 1,
   wherein the optical line terminal references the FEC code table, selects an FEC code used for communication with the optical network terminals, and notifies the selected FEC code to each of the optical network terminals.

3. The optical access system according to claim 1,
   wherein the band calculation section assigns a plurality of bands to an upstream signal from the optical network terminal, the band being equivalent to a length of the selected FEC code as a unit.

4. The optical access system according to claim 1,
   wherein the optical line terminal measures one of a distance and communication quality between the optical line terminal and the optical network terminal and selects an FEC code from the FEC code table based on a measurement result.

5. An optical network terminal that connects with an optical line terminal to configure the optical access system according to claim 1,
   wherein the optical network terminal uses a grant band and the FEC code notified from the optical line terminal to divide an upstream PON frame into a plurality of FEC code lengths for encoding and transmits the upstream PON frame to the optical line terminal.

6. An optical line terminal that connects with a plurality of optical network terminals to configure an optical access system,
   wherein the optical line terminal selects an FEC code used for communication with the optical network terminals from stored FEC code candidates based on one of a distance and communication quality between the optical line terminal and the optical network terminal; and wherein the stored FEC code candidate contains a parent code and a shortened code based on the parent code.

7. The optical line terminal according to claim 6, comprising a band calculation section that uses a code length of the FEC code to calculate a band assigned for communication with the optical network terminal.

8. The optical line terminal according to claim 6, wherein a selected FEC code is notified to each of the optical network terminals.

9. An optical access system comprising an optical line terminal and a first plurality of optical network terminals, wherein the optical line terminal selects and transmits a first FEC code corresponding to one of a first multicast signal and a first overhead signal for transmitting the same data to the plurality of optical network terminals and notifies the selected first FEC code;

wherein the optical line terminal selects and transmits a third FEC code corresponding to one of a second multicast signal and a second overhead signal for transmitting a first group which consists of a second plurality of optical network terminals; and wherein the optical line terminal selects and transmits a fourth FEC code corresponding to one of a third multicast signal and a third overhead signal for transmitting a second group which does not consist of the second plurality of optical network terminals.

10. The optical access system according to claim 9, wherein the optical line terminal selects and transmits a second FEC code corresponding to a unicast signal transmitted only to the optical network terminal from the optical line terminal independently of the first FEC code selected for one of the multicast signal and the overhead signal and notifies the selected second FEC code.

11. The optical access system according to claim 10, wherein the optical line terminal selects the second FEC code selected for the unicast signal based on one of a communication distance and communication quality between the optical line terminal and the optical network terminal; and the optical line terminal selects the first FEC code for one of the multicast signal and the overhead signal based on one of the longest distance and the highest communication quality provided by one of the optical network terminals communicating with the optical line terminal.

* * * * *